United States Patent
Butterfield et al.

(10) Patent No.: US 7,430,498 B2
(45) Date of Patent: Sep. 30, 2008

(54) SYSTEM, METHOD AND COMPUTER PROGRAM PRODUCT FOR DEVELOPING A SYSTEM-OF-SYSTEMS ARCHITECTURE MODEL

(75) Inventors: Marion L. Butterfield, Mission Viejo, CA (US); Haig F. Krikorian, Fullerton, CA (US); Alaka D. Shivananda, Yorba Linda, CA (US); John A. Gula, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 695 days.

(21) Appl. No.: 10/935,355

(22) Filed: Sep. 7, 2004

(65) Prior Publication Data

US 2006/0064178 A1 Mar. 23, 2006

(51) Int. Cl.
*G06F 17/50* (2006.01)
*G06F 9/445* (2006.01)

(52) U.S. Cl. .............................. 703/2; 703/22; 703/27; 709/223; 709/227; 709/238; 717/101; 705/8

(58) Field of Classification Search .................. 703/2, 703/22, 27; 709/203, 248, 223, 227, 238; 717/101; 705/8
See application file for complete search history.

(56) References Cited

U.S. PATENT DOCUMENTS 4,631,363 A * 12/1986 Foster et al. ............. 379/15.01
5,978,576 A * 11/1999 Sanadidi et al. ............... 703/22
6,941,341 B2 * 9/2005 Logston et al. ............. 709/203
7,139,999 B2 * 11/2006 Bowman-Amuah ......... 717/101
2003/0009250 A1 * 1/2003 Resnick et al. ................ 700/94
2005/0086384 A1 * 4/2005 Ernst .......................... 709/248
2005/0165829 A1 * 7/2005 Varasano .................... 707/102

OTHER PUBLICATIONS

Stephen Smart; *Requirements Management Plan*; May 2001; 30 pages; Version 0.8; The Great Idea—ABC Project; available at <http:// www-106.ibm.com/developerworks/rational/library/4421.html> (visited Sep. 7, 2004).

(Continued)

*Primary Examiner*—Thai Phan
(74) *Attorney, Agent, or Firm*—Alston & Bird LLP

(57) ABSTRACT

A method is provided for developing an architecture model for a system-of-systems (SoS) that includes n system levels $L_1 \ldots L_n$, each of which includes at least one component of the SoS. For at least $i>1$, each system level $L_i$ includes at least one component of level $L_{i-1}$. The method includes developing an architecture model for at least one level of the SoS. For at least $i>1$, the level $L_{i-1}$ architecture model can be developed by developing a functional architecture model for level $L_{i-1}$, and thereafter transforming the level $L_{i-1}$ functional architecture model into a physical architecture model for level $L_{i-1}$. The functional architecture model includes a functional and a logical structure for level $L_{i-1}$. And as such, the functional architecture model is developed based upon a concurrent functional and logical decomposition of a functional architecture model developed for level $L_i$.

25 Claims, 19 Drawing Sheets

OTHER PUBLICATIONS

Department of Defense (DoD) Office of the Under Secretary of Defense; *Configuration and Data Management* ; Apr. 2004; 2 pages; <http://www.acq.osd.mil/io/se/cm&dm/> (visited Sep. 7, 2004).

Pradip Kar, Michelle Bailey; *Characteristics Of Good Requirement*; 6th INCOSE Symposium; Jul. 1996; 10 pages; available at <http://www.complianceautomation.com/papers/incose_goodreqs.htm> (visited Sep. 7, 2004).

Washington State Department of Information Services; *Project Management Framework—Risk Management Plan* ; 2 pages; available at <http://www.dis.wa.gov/pmframework/planning/riskmgmt.htm> (visited Sep. 7, 2004).

Kathryn A. Kulick; *Technical Performance Measurement—A Systematic Approach to Planning, Integration, and Assessment* ; 1997-98; 3 pages; available at <http://www.acq.osd.mil/pm/tpm/kulick.htm> (visited Sep. 7, 2004).

DoD Systems Management College, *Systems Engineering Fundamentals*; Jan. 2001; pp. 112-116, available at <http://www.dau.mil/pubs/pdf/SEFGGuide%2001-01.pdf> (visited Sep. 7, 2004).

National Aeronautics and Space Administration (NASA); *General: The Peer Review Process* ; 2 pages; available at <http://pds.jpl.nasa.gov/documents/qs/peer_review.html> (visited Sep. 7, 2004).

Federal Aviation Administration (FAA); *Test and Evaluation Process and Guidance*; May 1999; 16 pages; available at <http://fast.faa.gov/flowcharts/testflow/sys60T.htm> (visited Sep. 7, 2004).

FAA; *Toolsets/Integrated Logistic Support Process Guide/Section 4* ; Jul. 2001; 4 pages; available at <http://fast.faa.gov/toolsets/ILSPG/Section4.htm> (visited Sep. 7, 2004).

Edmund H. Conrow; *A Web Site Devoted to Government Policy and References to Cost as an Independent Variable (CAIV)*; 1998; 3 pages; available at <http://www.caiv.com/> (visited Sep. 7, 2004).

National Software Corporation; *Using Rose—Rational Rose*; Jun. 2003; pp. 1-29; XP002418482.

Howard Lykins, Sanford Friedenthal, Abraham Meilich; *Adapting UML for an Object Oriented Systems Engineering Method (OOSEM)*; Proceedings of the 2000 INCOSE Symposium;2000; pp. 1-9; XP002417865.

Gabor Karsai, Janos Sztipanovits, Akos Ledeczi, Ted Bapty; *Model-Integrated Development of Embedded Software*; Proceedings of the IEEE; Jan. 2003; pp. 145-164; vol. 91, No. 1; IEEE, New York; XP011065.

Haig F. Krikorian; *Introduction to Object-Oriented Systems Engineering, Part 1*;IT Professional, IEEE Service Center, Los Alamitos, California; Mar. 2003; pp. 38-42; vol. 5, No. 2; XP011097286.

\* cited by examiner

SYSTEM, METHOD AND COMPUTER PROGRAM PRODUCT FOR DEVELOPING A SYSTEM-OF-SYSTEMS ARCHITECTURE MODEL

FIELD OF THE INVENTION

The present invention relates generally to systems, methods and computer program products for developing complex logical and/or physical system architecture models and, more particularly, to systems, methods and computer program products for developing logical and/or physical system-of-systems architecture models.

BACKGROUND OF THE INVENTION

In many industries, most systems have been designed as single systems that operate in a given manner, oftentimes independent of other systems with which the systems may function. However, with today's advances in technology, such a design approach is becoming more difficult to implement as systems are becoming more highly integrated with other systems. In this regard, whereas a development program may have previously only designed a single system, such a program may now be more likely to design a more complex single system, or a networked system-of-systems (SoS).

With the increase in the demand of programs to develop more complex systems and systems-of-systems, the size and complexity of the engineering tasks required to design such systems also naturally increases. And with the increase in the size and complexity of the engineering tasks required to design complex systems and systems-of-systems, program costs and risks also increase. Thus, whereas complex systems and systems-of-systems continue to be designed using conventional engineering techniques, such techniques generally do not provide the level of detail, discipline, process flow definition and architecture description required for the efficient and effective development of the architectures for future systems and systems-of-systems. Thus, it would be desirable to design a system, method and computer program product to design a system-of-systems architecture in a manner that provides a continuous and coherent architecture description and model from the system-of-systems level down to the base hardware and software component level.

SUMMARY OF THE INVENTION

In light of the foregoing background, embodiments of the present invention provide an improved system, method and computer program product for designing a system-of-systems (SoS) architecture that is equally applicable to complex systems, conventional systems and their subsystem elements. Embodiments of the present invention provide an architecture-centric, model-based approach to designing a SoS architecture that emphasizes concurrent development of the system architecture and system specifications. Embodiments of the present invention provide a seamless description of the system architecture from the SoS level down to each system's architecture base level. Advantageously, embodiments of the present invention include collaborative designing of the architecture in that it involves a plurality of engineering disciplines. Embodiments of the present invention facilitate capture of the requirements and provide an intuitive, visual depiction of the system structure and behavior, a design of simulation models (or prototypes), and a description of the implementation information in a visual modeling language, such as UML (Unified Modeling Language). Embodiments of the present invention also provide a single, managed model of the system architecture that can be used to drive both hardware and software design without translation or restatement, as may be required in conventional design techniques. Embodiments of the present invention also provide a single, managed model of the system architecture that incorporates those open system architecture techniques and standards that readily facilitate the use of evolutionary, incremental and spiral development approaches to address rapidly changing and improving technologies.

In accordance with one aspect of the present invention, a method is provided for developing an architecture model for a system-of-systems (SoS) that includes a plurality of components which collaborate to realize at least one goal established for the SoS. The SoS includes n system levels $L_1 \ldots L_n$ that each include at least one component of the SoS. And for at least i>1, each system level $L_i$ includes at least one component of level $L_{i-1}$. The method includes developing an architecture model for the SoS based upon the goals established for the SoS, and more particularly, developing an architecture model for at least one level of the SoS. In this regard, for at least i>1, developing an architecture model for level $L_{i-1}$ includes developing a functional architecture model for level $L_{i-1}$, such as in the case of developing a logical or physical SoS architecture model. Then, if so desired, the level $L_{i-1}$ functional architecture model can be transformed into a physical architecture model for level $L_{i-1}$, such as in the case of developing a physical SoS architecture model. The functional architecture model includes a functional and a logical structure for level $L_{i-1}$. As such, the functional architecture model is developed based upon a concurrent functional and logical decomposition of a functional architecture model developed for level $L_i$.

The architecture model for a level of the SoS can be developed in accordance with a requirements analysis whereby a requirements baseline is established for the level, and the architecture model is developed for the level of the SoS based upon the requirements baseline. In such an instance, the requirements baseline can include a plurality of modeling diagrams, such as unified modeling language (UML) diagrams, including a use case diagram, a class diagram and an interface class diagram. More particularly, for example, the requirements baseline for the level can be established by identifying at least one requirements source, developing at least one mission/system scenario. Then, at least one functional requirement for the level can be assessed based upon at least one developed mission/system scenario, at least one development product can be then verified, with level documentation generated and peer-reviewed before performing a requirements validation. In such an instance, the mission/system scenario(s) can be developed by identifying at least one mission/enterprise goal and at least one value recipient, and thereafter identifying at least one mission/enterprise service required to achieve at least one mission/enterprise goal. The mission/system scenario(s) can then be developed to achieve at least one mission/enterprise service for the level based upon at least one requirements source.

In addition to the requirements analysis, the architecture model for a level of the SoS can be developed in accordance with a functional analysis whereby a functional architecture model for the level is established, and the architecture model for the level of the SoS is developed based upon the functional architecture model. In this instance, the functional architecture model can include a plurality of modeling diagrams (e.g., UML diagrams) including an activity diagram, a state diagram, a collaboration diagram and a sequence diagram. More particularly, for example, the functional architecture model can be established by performing a functional analysis for the level to thereby establish a functional architecture model for the level that can be traced to a requirements baseline. Next, a functional architecture model for the level can be developed, where the functional architecture model includes a functional and a logical structure for the level. At least one effect of at least one quality attribute can be incorporated into the functional architecture model for the level. Then, at least one alternative functional architecture candidate model can be identified, after which a functional architecture model for the level can be selected from the developed functional architecture model and the at least one alternative functional architecture candidate model. Again, like in the requirements analysis, at least one development product can be then verified, with level documentation generated and peer-reviewed before performing a requirements validation.

Further, the architecture model for the level can be developed in accordance with a synthesis whereby a physical architecture model for the level is established, and the architecture model for the level of the SoS is developed based upon the physical architecture model. Similar to before, the physical architecture model can include a plurality of modeling diagrams (e.g., UML diagrams) including a class diagram and a component diagram. More particularly, for example, the physical architecture model can be established by identifying an initial physical architecture model for the level, and identifying at least one alternative physical architecture candidate model for the level. Next, the initial physical architecture model and the at least one alternative physical architecture candidate model can be assessed. A physical architecture model for the level can then be selected based upon the assessment. Also similar to before, at least one development product can be then verified, with level documentation generated and peer-reviewed. The selected physical architecture can then be verified against a requirements baseline and the functional architecture for the level.

According to other aspects of the present invention, a system and computer program product are provided for developing an architecture model for SoS.

BRIEF DESCRIPTION OF THE DRAWINGS

Figure 1:
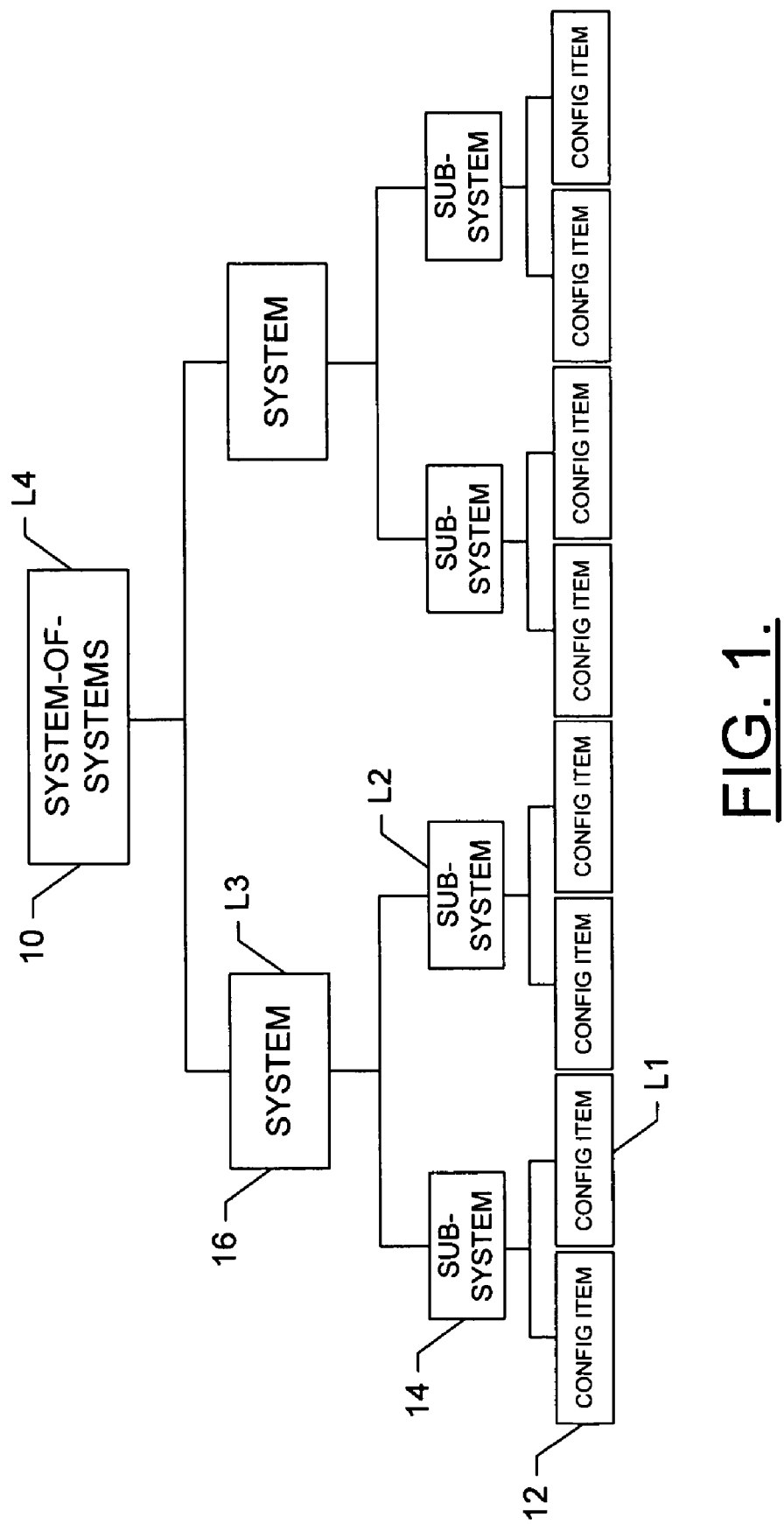
Figure 24:
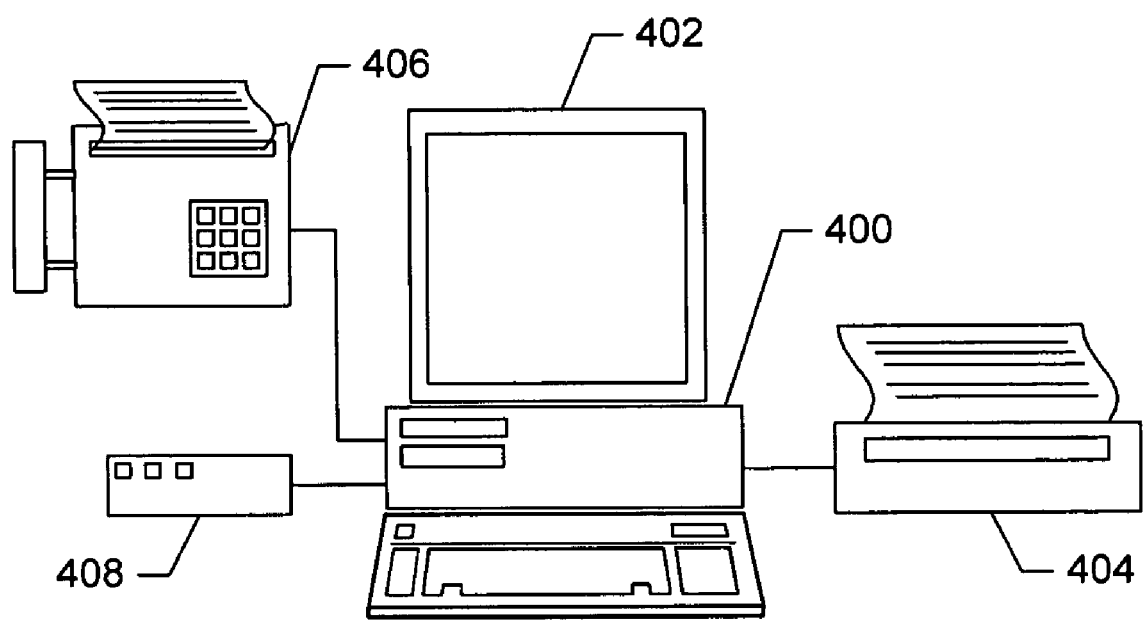

Having thus described the invention in general terms, reference will now be made to the accompanying drawings, which are not necessarily drawn to scale, and wherein:

FIG. 1 is a schematic block diagram of a complex system-of-systems (SoS) that would benefit from the system, method and computer program product of embodiments of the present invention;

FIGS. 2-23 are flowcharts illustrating various steps in a method of designing a system-of-systems architecture, in accordance with one embodiment of the present invention; and FIG. 24 is a schematic block diagram of the system of one embodiment of the present invention embodied by a computer system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring to FIG. 1, a complex system-of-systems (SoS) 10 that would benefit from the system, method and computer program product of embodiments of the present invention is illustrated. The SoS consists of n levels $L_1 \ldots L_n$, with n being a positive integer. In a complex SoS, each level above the first level generally comprises a plurality of components, with the components of the level being groups of the components of the level below. For example, the system illustrated in FIG. 1 consists of four levels, $L_1 \ldots L_4$. As illustrated, the level 4 complex SoS includes hardware and software configuration items 12 at level $L_1$, subsystems 14 at level $L_2$ and systems 16 at level $L_3$. The systems at level $L_3$ are groups of the respective subsystems at level $L_2$. And the subsystems at level $L_2$ are groups of the configuration items at level $L_1$. In the military, for example, the fourth level might constitute a joint-force, networked SoS composed of an aircraft, a ship, a satellite space system, a satellite ground system, and a fixed command and control ground center, with the third, second and first levels comprising systems, subsystems and hardware and software configuration items of the respective SoS. As evident, the number of levels in the complex SoS depends upon the complex SoS. Therefore, it should be understood that the systems, methods and computer program products of the present invention can be employed by the complex SoS with any number of levels. It should further be understood that whereas embodiments of the system, method and computer program product are described herein with respect to a military context, the system, method and computer program product may be equally applicable to a number of other contexts, including commercial and/or educational contexts.

Figure 2:
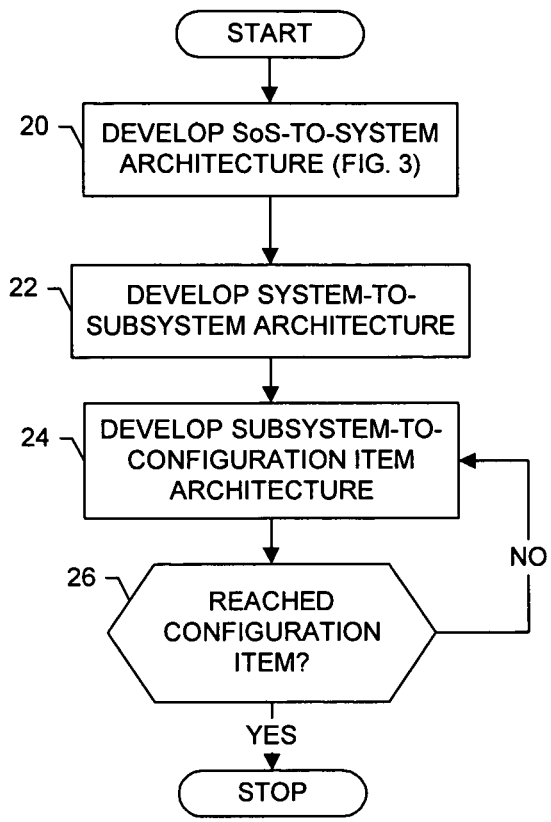

In accordance with embodiments of the present invention, the architecture of the SoS 10 is designed or otherwise developed from the SoS level 4 down to the configuration items at level 1. Referring briefly to FIG. 2, then, a method of designing a SoS includes developing the SoS-to-system architecture, as shown in block 20. As illustrated in block 22, the system-to-subsystem architecture can thereafter be developed. Then, after developing the system-to-subsystem architecture, the subsystem-to-configuration item architecture can be developed, as shown in block 24. And as will be appreciated, the subsystem-to-configuration item architecture can continue to be developed until the configuration items of the SoS are reached, as shown in block 26.

As used herein, reference will be made to "architectures." It should be understood, however, that in various instances those architectures are more particularly "architecture models" that are representative of respective architectures. An architecture model, then, can refer to a set of significant decisions regarding the organization of the SoS 10 (or a level of the SoS), and the selection of the structural components and the interfaces of those components by which the SoS is composed. The architecture model can also refer to the behavior of the components as specified in collaborations among those components, as well as the composition of the structural and behavioral components into progressively larger levels of the SoS. In addition, the architecture model can refer to the architectural style that guides the SoS—the components and their interfaces, collaborations, and composition. The architecture model is not only concerned with structure and behavior, but also with usage, functionality, performance, resilience, reuse, comprehensibility, economic and technology constraints and trade-offs, and aesthetic concerns. As used herein, then, the architectural model can be represented by one or more modeling diagrams, such as one or more Unified Modeling Language (UML) diagrams, and/or any supporting information, developed, established, provided, updated or the like during development of the SoS or any one or more levels thereof, as described below.

More particularly now, reference will be made to FIGS. 3, 4, 5 and 6, which illustrate various steps in a method of developing the SoS-to-system architecture (see block 20). However, it should be understood that, unless otherwise indicated, the same method can be equally applicable to developing the system-to-subsystem architecture, and/or the subsystem-to-configuration item architecture, without departing from the spirit and scope of the present invention.

Figure 3:
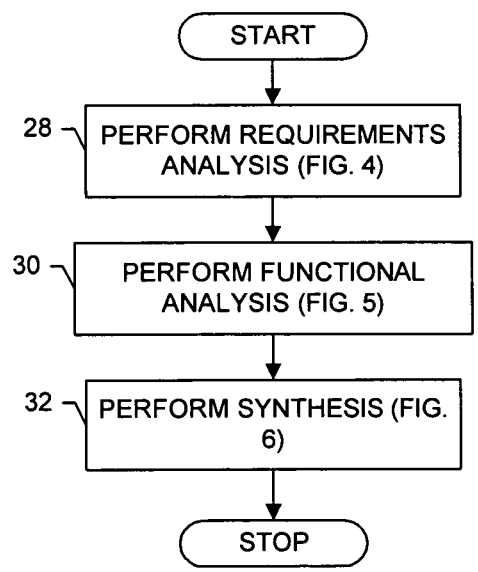

As shown in block 28 of FIG. 3, then, the method includes performing a requirements analysis of the SoS-to-system level. As explained with reference to FIG. 4 below, requirements analysis is performed to establish a system requirements baseline, which can be presented in a graphical form and is traceable to the customer and user requirements of the SoS 10. In this regard, performing requirements analysis often begins with determining the needs of the customer. Then, once the purpose of the system is known, the requirements baseline can be established. After performing the requirements analysis, functional analysis can be performed based upon the requirements baseline, as shown in block 30. As explained with reference to FIG. 5, functional analysis can be performed to establish a SoS-to system functional architecture. Thereafter, synthesis can be performed for the SoS-to-system architecture based upon the functional architecture, as shown in block 32. Synthesis, as explained in more detail with reference to FIG. 6, ensures that design concepts are achieved through proper consideration of all system influences. The synthesis process is the "how" answers to the "what" tasks of the functional architecture. In this regard, the functional architecture can be translated into a physical SoS-to-system architecture that includes of arrangements of system elements, the decomposition of these elements, their internal and external interfaces, physical constraints, and designs.

I. Requirements Analysis

A. Identify Requirements Sources

Figure 4:
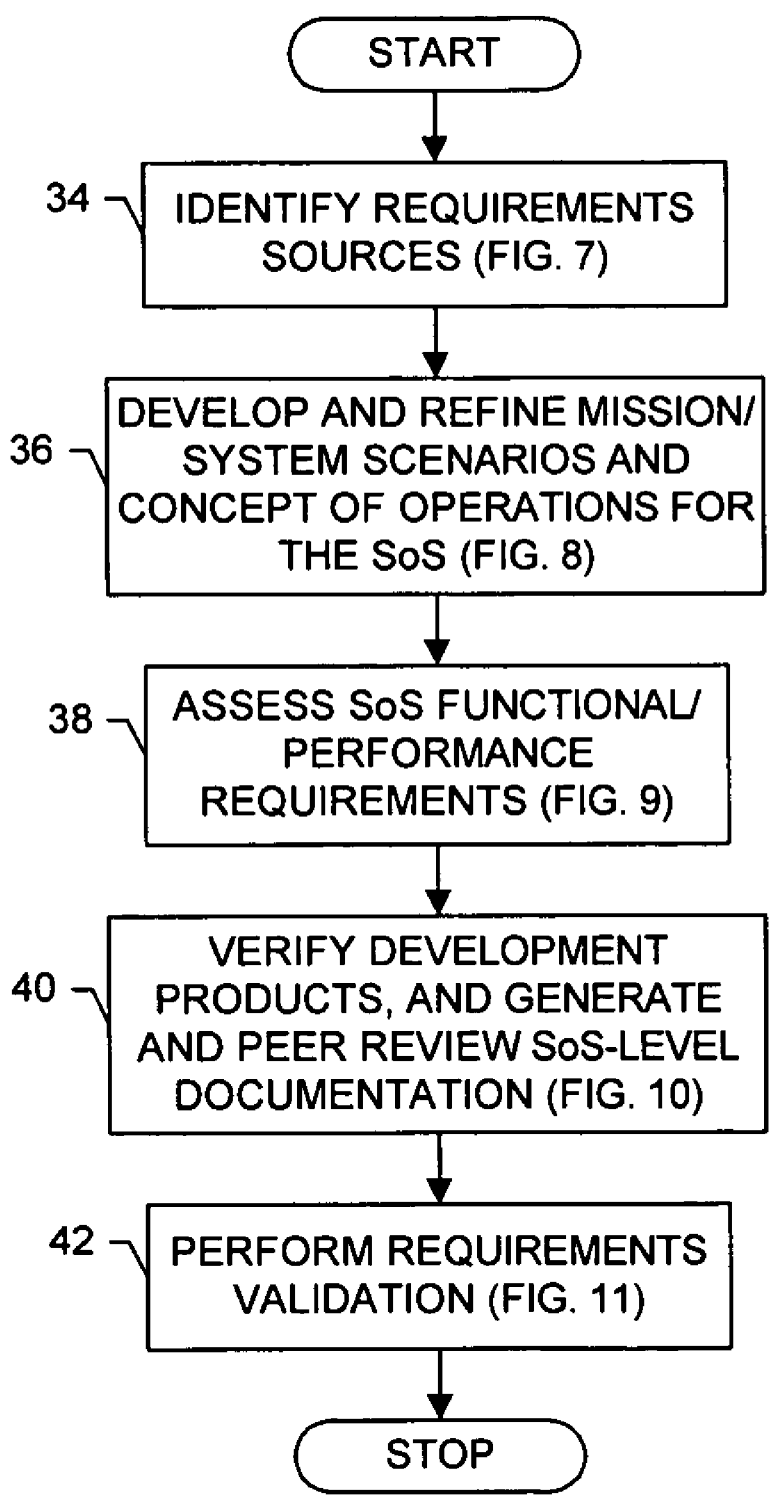

Referring now to FIG. 4, a method of performing requirements analysis of the SoS-to-system level includes identifying one or more requirements sources, as shown in block 34. To identify the requirements sources, a systems engineer or other system user can elicit, identify, prioritize, define and quantify customer expectations and constraints and, if so desired, can provide the customer with a status on a regular basis to facilitate review and coordination of requirements. More particularly, as shown in block 68 of FIG. 7, a systems engineer can identify all SoS stakeholder expectations, requirements sources, contractual obligations and/or constraints, including collecting and reviewing documentation related to such information.

For example, the systems engineer can review documentation and other information such as a statement of objectives (SOO), capstone requirements document (CRD), initial capabilities document (ICD), capability development document (CDD), capability production document (CPD), Mission Requirements Document (MRD), request for proposals (RFP), enterprise expectations, and/or other governing documents such as corporate documents or the like. Additionally or alternatively, for example, the systems engineer can review customer needs, requirements, objectives in terms of missions, measures of effectiveness, technical performance, utilization, environments and/or constraints. Requirements from contractually-cited documents for the system and its configuration items can also be reviewed, as can technical objectives, records of meetings and conversations with the customer, enterprise goals and objectives, technical proposals, universal joint task lists (UJTL), stakeholder baselines, mission/enterprise goals and objectives, and/or operations concepts.

As the documentation is reviewed, one or more requirements can be captured or otherwise stored in a requirements management database. In addition, one or more risks associated with the requirements, including the technical, schedule and/or cost risks, can be identified, described and ranked, as shown in block 70. As the requirements management database is populated, the information can be used as inputs to an initial architecture model, as explained below. In this regard, the requirements management database can be used to generate a system/subsystem specification (SSS) and other documents. Similarly, as the risks are identified, described and ranked, one or more risks can be generated and captured into a risk management database. To facilitate generating and transcribing the risks, a risk identification worksheet can be produced to document the technical, schedule and cost risks. Thus, risk considerations can be incorporated into the method of designing the SoS, the risks capable of being systematically addressed throughout the architecture development based on the risk level and priority.

B. Develop Mission/System Scenarios

After identifying the requirements sources, one or more mission/system scenarios and concept of operations (CONOPS) for the SoS 10 can be developed, and refined if so desired, based upon the requirements sources, as shown in block 36 of FIG. 4. More particularly, with reference to FIG. 8, after identifying the requirements sources, the boundary of the SoS can be defined, and systems (including organizations and individuals) external to, and interactive with, the SoS can be identified, as shown in block 72. In this regard, the SoS boundary and external systems can be identified based upon, for example, the ICD, CDD, CPD and/or CRD. Then, SoS-relevant mission/enterprise-level value recipients can be identified, as well as the SoS and the value (e.g., quality, price, etc.) provided by the SoS to such recipients, as shown in block 74. In this regard, the recipients can be at an executive level of an organization including, for example, one or more agencies (e.g., Pentagon, Congress, etc.), a joint warfare capability assessment team, functional capabilities board, milestone decision authority, program manager and/or senior executive council. As will be appreciated, as the value recipients can be at the executive level, such recipients may not include the actual operators or users of the SoS (although individual recipients may include the operators or users as members).

As or after identifying the value recipients, a mission/enterprise context class diagram can be created, such as based upon the ICD, CDD, CPD and/or CRD. In this regard, the mission/enterprise context class diagram can include, for example, a set of classes representing logical domain objects of the SoS. The set of classes can then be annotated to show the interfaces, and collaborations and relationships between the classes and the value recipients, such as by showing the value provided to a value recipient by a SoS logical object represented by a class. After creating the mission/enterprise context class diagram, the SoS-relevant mission/enterprise level goals can be identified and expressed as SoS use cases in a mission/enterprise goal use case diagram, as shown in block 76. Similar to before, the SoS-relevant mission/enterprise level goals can be identified based upon the ICD, CDD, CPD and/or CRD, can also be based upon other customer documents. As will be appreciated, the use case diagram can include the mission/enterprise goals as the use cases and the value recipients as the actors, with the use cases being associated with the actors. In the use case diagram, the use cases can be associated with the actors, and the associations can be annotated with the value provided to the actors by the use cases. Also in the use case diagram, the use case names are typically at the same level of semantic meaning, beginning with an active verb and a measurable noun to convey meaning to the project stakeholders.

After creating the use case diagram, an initial set of services that the SoS 10 must be capable of performing to satisfy the mission/enterprise goals can be identified based upon a review of customer documents and sources, such as the ICD, CDD, CPD and/or CRD, as shown in block 78. In addition, such services can also be identified based upon system experience, domain knowledge, framework/patterns, business rules, and/or program constraints such as reuse, legacy, and minimum technology maturity levels. Then, for each service, the actor(s) (human roles or systems external to the SoS) providing the identified services can themselves be identified. The services and associated actors can then be listed in a mission/enterprise worksheet under a respective use case goal. In this regard, the mission/enterprise worksheet is a working aid to document the flow of goals to use cases, actors external to the SoS, performance requirements, and expected states.

Then, the mission/system scenarios that the SoS 10 must be capable of performing to satisfy the mission/enterprise goals can be identified, as shown in block 80. More particularly, the mission/system scenarios (operational/functional workflow) and activities that the SoS must perform to satisfy the mission/enterprise goals can be identified based upon the CDD and/or other customer sources including the ICD, CPD and/or CRD. In addition, such activities can be identified based upon, for example, system experience, domain knowledge, framework/patterns, business rules, and/or program constraints such as reuse, legacy, and/or minimum technology maturation levels. Then, each mission/system scenario can be analyzed to identify the services being performed as each mission/system scenario can be expected to realize one or more services, the services typically being above implementation, technology, or doctrine. In this regard, the mission/system scenarios can imply implementation, technology, or doctrine, whereas, services typically do not. For each service, then, the actor(s) (human roles or systems external to the SoS) providing the service can be identified. Thereafter actor(s) can be listed under a respective use case goal in the mission/enterprise worksheet along with their associated service.

After identifying the mission/system scenarios of the SoS 10, the list of services can be reconciled for redundancy, as shown in block 82. To reconcile the list of services, the mission/enterprise worksheet can be surveyed, while noting similar service/actor pairs. At least one of the similar service/actor pairs can then be renamed such that all of the similar service/actor pairs have a common service name and actor name. Also, each mission/enterprise goal can be analyzed for completeness, with missing services that the SoS must be capable of performing with actors external to the SoS being added to the mission/enterprise worksheet. In addition, the services can be analyzed to ensure that the services are above implementation, technology, and doctrine. Use case names for each service/actor pair can then be developed, and added to the mission/enterprise worksheet, the service/actor being associated with an appropriate use case goal.

After reconciling the list of services and adding missing services to the mission/enterprise worksheet, completeness of the mission/system scenarios that the SoS 10 must be capable of performing to satisfy the mission/enterprise goals can be analyzed, as shown in block 84. As will be appreciated, requirements analysis for a complex system must typically be organized and approached systematically to ensure complete evaluation of the system's functions across the broad spectrum of real world conditions. Thus, a mission decomposition matrix (MDM) can be used to provide an organized analysis of mission phases and conditions, from which the mission/enterprise worksheet can be updated. In this regard, a MDM, which is typically only used at the SoS and system levels of the complex SoS 10, is a multidimensional matrix that includes columns representing the mission phases, rows representing the mission conditions, and separate sheets for identifying analysis and test coverage. Typical sheets include, for example, a sheet indicating analysis and test coverage, a sheet identifying applicable demonstrations, and a sheet identifying the applicable functional analysis elements. A key benefit of the MDM is that it drives requirements analysis in a mission context and from a user's viewpoint. The MDM also captures the relationship of the requirements analysis products. This process aids in defining system demonstration needs to characterize a mission scenario. By coding the cells addressed in a given spiral, the mission capabilities that will be effective upon completion of the spiral can be defined.

After analyzing the completeness of the mission/system scenarios that the SoS 10 must be capable of performing to satisfy the mission/enterprise goals, the SoS use cases and the respective actors from the mission/enterprise worksheet can be added or otherwise assembled into the SoS use case diagram, as shown in block 86. In the use case diagram, as before, the association between the use case and the actor can be annotated with the service provided by the actor. Also, if so desired, the use cases in the use case diagram can be organized by extracting common behavior (through included relationships) and/or distinguishing variants (through extended relationships). Thereafter, a use case description can be developed for each use case and included in the use case diagram, as shown in block 88. In this regard, the use case description can include information such as the use case name, actors, pre-conditions, post-conditions or the like. In addition, the use case description can include a unique identifier for the respective use case and, if the use case is under a configuration management, a version control value.

Then, once the use case diagram includes the use case descriptions, functional requirements can be identified based upon the use case descriptions, as shown in block 90. Typically, the functional requirements are identified while considering the information from the source requirements documentation that pertains to the SoS use cases. Then, after identifying the functional requirements, the functional requirements can be allocated to the existing use cases, and documented in the corresponding use case descriptions. Also, the requirements management database can be updated with the functional requirements. Architecturally-significant quality attributes (e.g., reliability, availability, etc.) that affect the SoS level can thereafter be identified, such as from a technical statement of work, customer specifications, domain knowledge, the mission/enterprise worksheet, the SoS use case diagram, a standard list of quality attributes, a customer's technology roadmap and/or a domain technical reference model, as shown in block 92. For example, interoperability can be one of the most significant quality attributes at the SoS level since network-centric operations (NCO) are typically inherent to a SoS 10. Then, from a review of the mission/enterprise worksheet and/or the SOS use case diagram, the quality attribute services that the SoS must typically be capable of performing to satisfy the mission/enterprise goals can be identified. In addition to the mission/enterprise worksheet and/or the SOS use case diagram, such services can also be identified based upon, for example, system experience, domain knowledge, framework/patterns, business rules, and/or program constraints such as reuse, legacy, minimum technology maturation levels, and/or a technology roadmap. Then, for each new service, the actor that initiates the service and/or gains value from the service can be identified, and the services and their actors can be added to the mission/enterprise worksheet under a respective use case goal.

Once the architecturally-significant quality attributes that affect the SoS level have been identified, the architecturally-significant quality attributes can be documented with a use case in the use case diagram, as shown in block 94. More particularly, for each quality attribute service/actor pair in the mission/enterprise worksheet, a use case can be created and added to the SoS use case diagram, with a corresponding use case description also being created. Performance requirements that affect the SoS level, such as customer key performance parameters (KPPs), can then be identified, such as from the ICD, CDD, CPD, a mission requirements document (MRD), a test and evaluation master plan (TEMP), and/or other customer documents, survey, and/or interviews, as shown in block 96. If so desired or necessary, the measures and indicators of the customers' satisfaction with the products and services can be derived. In defining the KPPs, systems effectiveness measures that reflect overall customer expectations and satisfaction can be identified or otherwise defined. In this regard, measures of effectiveness (MOEs) can be related to how well the system must perform in the customer's mission. Key MOEs can include, for example, mission performance, safety, operability and/or reliability. Then, after identifying the key performance requirements, the performance requirements can be associated with respective functional requirements and documented in respective use case descriptions.

A quality function deployment (QFD) matrix can then be developed based on the KPPs and/or MOEs, as shown in block 98. The QFD can be used as a tool in defining the customers' needs, and can be referenced while performing requirements validation, as explained below. In this regard, meetings between the customer and the systems engineer or user may be necessary to capture the customer needs and develop a QFD matrix. Also after identifying the key performance requirements, the functional, performance and non-functional (i.e., quality attributes) requirements can be documented or otherwise saved in the requirements management database, as shown in block 100.

Thereafter, a SoS context class diagram can be created with top-level SoS object and external systems, the context class diagram illustrating the logical static design view of the SoS 10, as shown in block 102. The context class diagram can comprise a class diagram that includes a set of classes representing the logical domain objects, as well as interfaces and collaborations between the classes, and their relationships. The context class diagram is typically free from the constraints of technology, doctrine, and implementation. To create the context class diagram, the bounded SoS can be defined, with the external systems and their interaction with the SoS identified. Also, as the context class diagram is created, information from the source requirements documentation that pertains to system logical legacy objects is typically considered. This source requirements documentation can include, for example, the ICD, as well as government furnished equipment (GFE), government furnished information (GFI), government off-the-shelf (GOTS) software, customer furnished equipment (CFE), customer furnished information (CFI), and/or commercial off-the-shelf (COTS) software.

After creating the SoS context class diagram, the SoS logical object can be updated with performance requirements, as shown in block 104. More particularly, the textual description of the SoS logical object in the SoS context class diagram can be updated with the performance requirements for the SoS level. Then, the SoS boundary interfaces can be defined, as shown in block 106. The interface data definitions, their protocols, and transmission medium can then be captured in a SoS logical interface class diagram based on the context class diagram, and/or source requirements documentation such as, for example, the GFE, GFI, GOTS software, CFE, CFI and/or COTS software. The logical interface class diagram is a class diagram that includes the interface data definitions, protocols, and environment for each interface at any given level. As desired, the information in such a logical interface class diagram can be documented as attributes in the interfaces classes or textually in the class specifications of the interface classes. In addition, the information can be captured or otherwise saved in the requirements management database, if so desired.

C. Assess Functional/Performance Requirements

Again referring to FIG. 4, after developing and refining the mission/system scenarios and CONOPS for the SoS 10 (see block 36), the SoS functional/performance requirements can be assessed based upon the mission/system scenarios and CONOPS, as shown in block 38. Now referring to FIG. 9, in assessing the SoS functional/performance requirements, the SoS-level functional, non-functional and performance requirements can be reviewed to capture, in the requirements management database, those requirements that cannot otherwise be represented in the initial architecture model, as shown in block 108. After capturing the requirements that cannot be represented in the initial architecture model, the technical architecture can be identified, such as by identifying and defining the design standards used for the SoS products under development, as shown in block 110. The required design characteristics can be identified and defined based upon architecture and design characteristics in the form of standards, as well as one or more reference models and associated component description references.

In addition, the technical architecture requirements can be defined, such as in a technical standards profile. In this regard, the technical standards profile can include a set of systems standards rules that govern systems implementation and operation of an architecture. The technical standards generally govern what hardware and software may be implemented and what system data formats may be used. That is, the profile delineates which standards may be used to implement the systems, system hardware/software items, communications protocols, and system data formats, for example.

Irrespective of how the technical architecture requirements are defined, requirements assessment can then be performed to ensure the system engineer or user has captured all of the requirements into a requirements structure (typically using a requirements management process) that indicates, where applicable, subordinate-superior (i.e., child-parent) relationships, as shown in block 112. Each requirement can then be verified to ensure the requirement is a "good" requirement, with those requirements deemed "poor" requirements rewritten into good requirements. Then, a T & E (test and evaluation) method and a T & E phase can be identified for each requirement. Although the requirements assessment can be more particularly performed in any of a number of different manners, for more information on various techniques that could be employed to perform a portion or more of the requirements assessment see: Stephen Smart, *Requirements Management Plan* (2001)<http://http://www-106.ibm.com/ developerworks/rational/library/4421.html>; Department of Defense (DoD) Office of the Under Secretary of Defense, *Configuration and Data Management* (last modified Apr. 5, 2004)<http://www.acq.osd.mil/io/se/cm&dm/>; and Pradip Kar & Michelle Bai, *Characteristics Of Good Requirement*, 6th INCOSE Symposium (July 1996), available at <http://www.complianceautomation.com/papers/incose_goodreqs.htm>, the contents of all of which are hereby incorporated by reference in its entirety.

D. Verify Development Products, Generate/Peer-Review Documentation

After assessing the SoS functional/performance requirements (see block 38), one or more of the development products can be verified, with SoS-level documentation thereafter generated and peer-reviewed, as shown in block 40 of FIG. 4. More particularly, now with reference to FIG. 10, the systems engineering development products (e.g., mission/enterprise context class diagram, mission/enterprise goal use case diagram, SoS use case diagram, mission/enterprise worksheet, SoS context class diagram, SoS logical interface class diagram, etc.) can be verified. For example, as shown in block 114, the value recipient and value names in the mission/enterprise context class diagram can be checked to verify that each has the same level of abstraction (detail). Similarly, the use case goal names in the mission/enterprise goal use case diagram can be checked to verify that each has the same level of abstraction. In addition, the value recipients and corresponding values in the mission/enterprise context class diagram can be checked to verify that each is represented in the mission/enterprise goal use case diagram.

The SoS use case diagram and mission/enterprise worksheet can be checked to verify each entry in the mission/enterprise worksheet has a corresponding use case in the SoS use case diagram, and that the use case names and actor names are at the same level of abstraction, as shown in block 116. The use case names can also be checked to verify that each includes an active verb followed by a measurable noun describing the goal or value that the use case is providing to its actor, and is relevant to the customer. In addition, the actor names can be checked to verify that each comprises a noun, is relevant to the customer, and models a role as opposed to a particular person. The SoS use case diagram and the associated use case descriptions, as well as the use case descriptions, can also be verified for consistency. In this regard, all of the use cases can be checked to verify that each are described with the same level of abstraction, and to ensure that there are no superfluous use cases (e.g., no use cases that are outside the boundary of the SoS 10, do not lead to the fulfillment of a goal for an actor, or duplicate functionality described in other use cases, etc). Further, the use cases can be checked to verify that all use cases lead to the fulfillment of exactly one goal for an actor, and that goal is clear from the use case name.

The SoS context class diagram and the SoS logical interface class diagram can be checked to verify that the names of corresponding actors are consistent between the diagrams, and that the external systems are consistent between the diagrams, as shown in block 118. In addition, the associations between objects in the SoS context class diagram and the SoS logical interface class diagram can be checked for consistency.

After verifying the systems engineering development products, a preliminary SoS system/subsystem specification (SSS) and preliminary SoS interface requirements specification (IRS) can be generated for review, as shown in blocks 120 and 122. The SSS can be generated based upon the requirements management database and a requirements management process, and the IRS is generated based upon the SoS logical interface class diagram. In this regard, SSS generally specifies the requirements for a system or subsystem and the methods to be used to ensure that each requirement has been met. The SSS can therefore include all functional, non-functional, and performance requirements for the SoS. The IRS, on the other hand, generally identifies interface requirements that flow down from the system specification. The IRS serves to document the manner in which information flows among various computer software configuration items (CSCIs), external interfaces, and critical items in the system. As such, the IRS typically includes the definitions of the interfaces between the SoS 10 and the external systems.

Once the SSS and IRS have been generated, the standards of the technical standards profile that apply to the SoS architecture can be updated, as can the QFD with customer needs and the associated performance requirements, as shown in blocks 124 and 126. Then, peer reviews can be performed on the generated SSS and IRS, as well as the technical standards profile, initial architecture model and QFD matrix, as shown in block 128. Peer reviews can be performed in any of a number of different manners, such as will be appreciated by those skilled in the art.

E. Perform Requirements Validation

Referring again to FIG. 4, after generating and peer-reviewing SoS-level documentation (see block 40), requirements validation can be performed, as shown in block 42. In performing requirements validation, then, requirements can be compared to customer expectations, enterprise and project rules, and external constraints. Then, variances and conflicts can be identified, and baseline requirements can be established. More particularly with reference to FIG. 11, the established requirements management database (e.g., SSS and/or IRS) can be analyzed and compared against customer expectations (e.g., end-user marketing) to ensure technical requirements represent customer's needs and constraints, as shown in block 130. After analyzing and comparing the requirements management database against customer expectations, a confirmed agreement and correlation of requirements to expectations can be developed along with completed formal technical reviews, a requirements traceability matrix, and records of stakeholder interactions.

Also, the established requirements baseline can be analyzed and compared against enterprise and project constraints based upon information such as policy and procedure manuals, defined risk levels, project plans, project resources, technology limitations, program objectives, program vision support plans (VSPs), program decisions or the like, as shown in block 132. In this regard, the requirements baseline can be analyzed and compared against enterprise and project constraints to ensure technical requirements satisfy enterprise and project policies and procedures, and to further develop the confirmed agreement and correlation of requirements to expectations, and to develop a requirements validation record. In addition, the established requirements baseline can be analyzed and compared against external constraints to ensure that the technical requirements meet applicable national and international laws, such as applicable EPA standards, acquiring agency policies, T & E facility environmental requirements or the like, as shown in block 134. This analysis and comparison can then lead to further development of the agreement and correlation of requirements to expectations, and requirements validation record.

Further, the customer needs can be compared to performance requirements, such as by assessing the QFD matrix to develop a QFD assessment report, as shown in block 136. The QFD matrix can be assessed in a number of different manners, but in various embodiments, the QFD matrix can be assessed by addressing the following areas of discussion: (a) "If I achieve (HOW) at the Target Value, will that help me satisfy my Customer's NEEDS?" (Strong=9, Medium=3, Weak=1); "What can I do to better satisfy my Customer's NEEDS?"; "Am I doing things that my Customer doesn't need?"; "Do we have the Customer's top ten NEEDS properly identified and should I put more emphasis on them?"; and/or "Should I 'Maximize/Minimize' selected 'HOWS' to better meet my Customer's NEEDS?." A technical performance measurement (TPM) can be initiated for any one or more of the areas of discussion that produce an item where the customer's needs are unclear or indeterminate. Likewise, a TPM will be initiated for any item in a "Target Value" (e.g., Strong=9, Medium=3, Weak=1) where a TBD (to-be-determined) or TBS (to-be-specified) is identified.

By performing the preceding analyses and comparisons, requirements variances and conflicts can be identified, as shown in block 138. From the identified variances and conflicts, identified areas of disagreement can be defined, along with a requirements validation compliance record and a requirements validation exception record. Then, baseline requirements can be established by resolving the requirements variations and conflicts, as shown in block 140. For example, the system engineer or user can negotiate an agreement with the customer that includes the SoS-level requirements that represent an acceptable balance of the customer's needs and expectations. In establishing the requirements baseline, the requirements management database can be validated.

II. Functional Analysis

A. Perform Functional Analysis

Referring again to FIG. 3, after performing the requirements analysis, functional analysis can be performed, as shown in block 30. More particularly with reference to FIG. 5, functional analysis can be performed by first performing SoS functional analysis to establish a complete functional architecture that can be traced to the baseline requirements, which in turn can be traced to the customer and user requirements, as shown in block 44. In this regard, the functional architecture can be established to include a functional structure and a logical structure. As explained herein, the functional structure can comprise that part of the functional architecture that is represented by the activity diagrams (shows functionality). The logical structure, on the other hand, can comprise that part of the functional architecture that is represented by the logical objects in the modeling diagrams (objects in the swim lanes in activity diagrams, class objects in the context diagrams, etc.).

Figure 12:
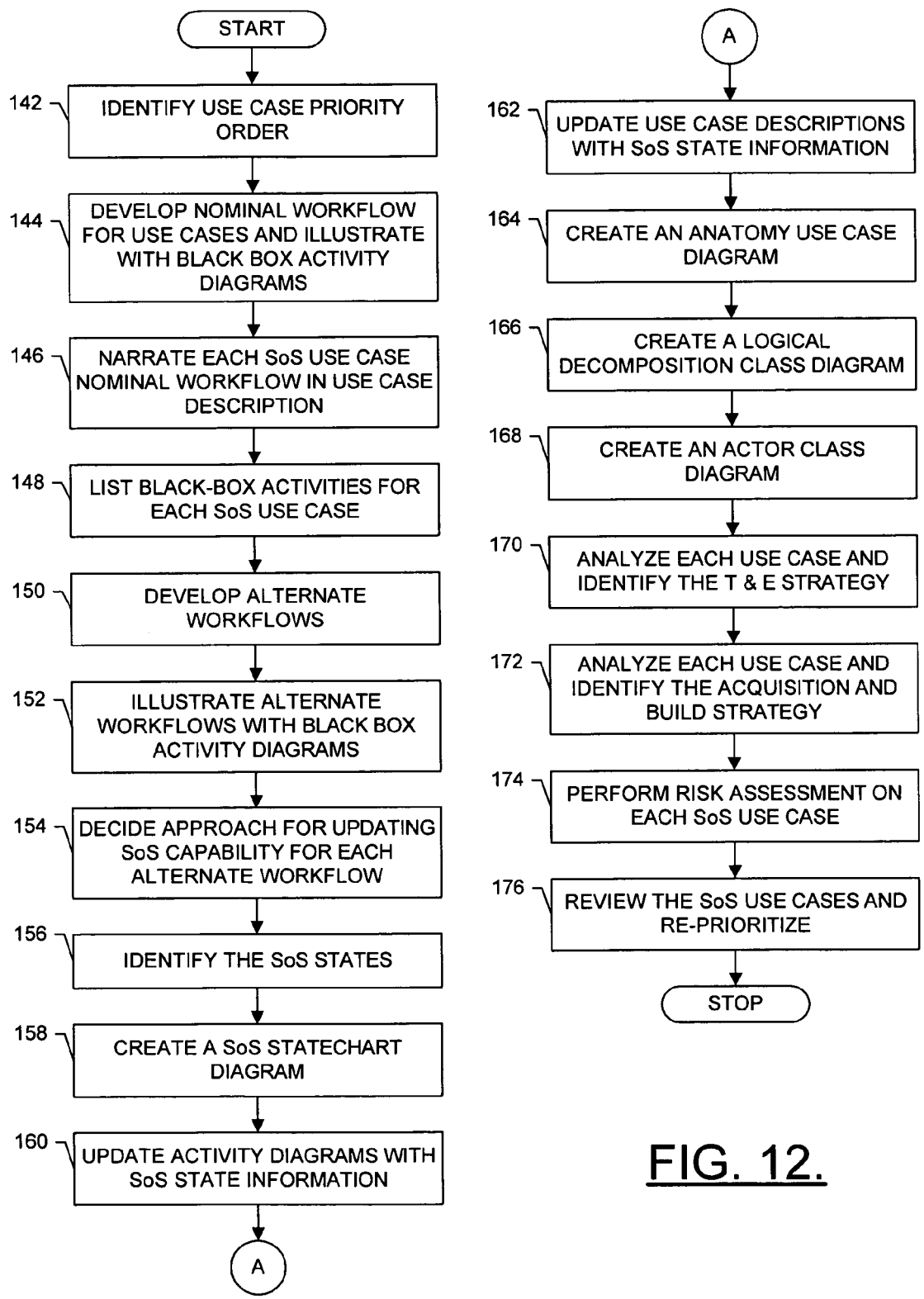
Figure 13:
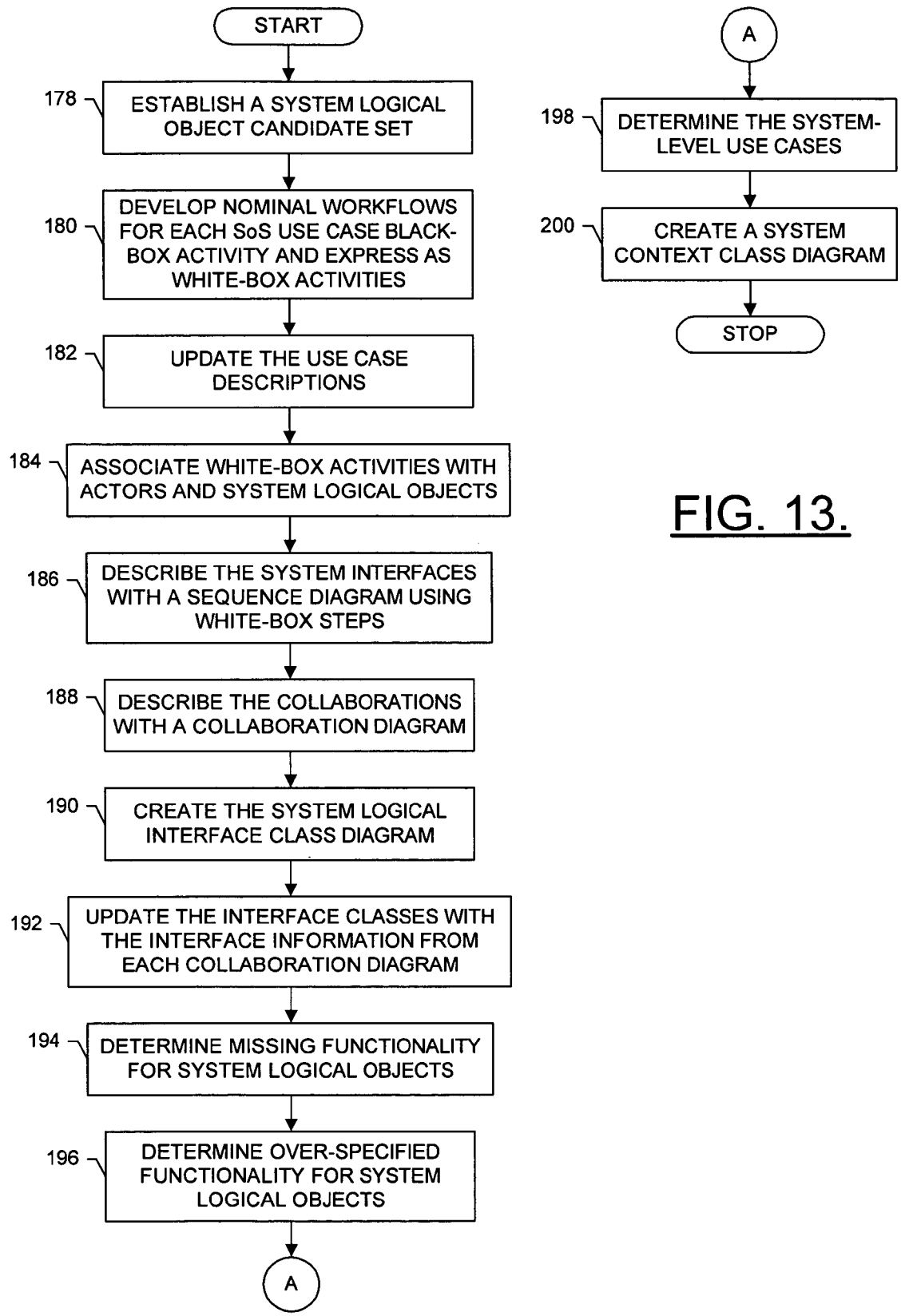

The SoS functional analysis can be performed in any of a number of different manners, but in one embodiment, the SoS functional analysis is performed in accordance with a method shown in FIG. 12. As shown in block 142 of FIG. 12, then, performing functional analysis in accordance with one embodiment of the present invention includes identifying a use case priority order. In this regard, all of the use cases can be prioritized with a value, such as low, medium or high, based on the influence of the respective use cases on the architecture and the acquisition strategy preferred by the customer. The priorities can then be documented in the use case descriptions.

After identifying the use case priority order, a nominal workflow for each use case can be developed and illustrated with a black-box activity diagram, as shown in block 144. In this regard, the nominal workflow can be developed for each use case in order of their priority, where the nominal workflow is developed as a series of activities performed by the SoS 10 and by actors external to the SoS. Then, with system experience, domain knowledge, framework/patterns, business rules, and/or program constraints such as reuse, legacy and/or minimum technology maturation levels, each use case can be analyzed, with a nominal, successful path through the use case described. A workflow can be developed using black-box activities (i.e., interactions between the SoS and its actors), with the actors, SoS logical objects, and activities graphically depicted in a black-box activity diagram. In such black-box activity diagrams, the so-called swim lanes can be divided into the activities performed by the external systems (actors) and the activities performed by the SoS, as will be appreciated by those skilled in the art.

Once the nominal workflow for each use case has been developed and illustrated with a black-box activity diagram, each SoS use case nominal workflow, as well as the nominal, successful path through the use case, can be narrated in a use case description, as shown in block 146. Then, the black-box activities for each SoS use case can be listed, as shown in block 148. In this regard, from the nominal activity diagram (i.e., black-box activity diagram) for each SoS use case, the black-box activities can be listed with their associated actor in order of logical sequence in the use case description. In addition, the activities in the nominal activity diagram can be reviewed and documented as black-box steps in the use case description. The black-box step sequence can then be reviewed to ensure that all of the black-box steps required for the SoS 10 to complete the parent use case exist. In addition, the associated actors and their actions can be identified with the appropriate black-box step, with performance requirements for the black-box steps derived from the use case's performance requirements.

After listing the black-box activities for each SoS use case, alternate workflows can be developed for each SoS use case, as shown in block 150. More particularly, each SoS use case can be analyzed based upon system experience, domain knowledge, framework/patterns, business rules, and/or program constraints such as reuse, legacy, and/or minimum technology maturation levels. Then, one or more use case scenarios that deviate from the nominal path for each SoS use case can be described, with performance requirements for the steps of the alternate workflows derived from the respective use case's performance requirements. As will be appreciated, such scenarios may be successful in achieving the goal of the use case, may be exception paths that end differently from the nominal path, or may be anticipated changes to the use case (e.g., planned system modifications).

With the alternate workflows, the alternate workflows can be illustrated with black-box activity diagrams, as shown in block 152. Then, for each workflow, an approach for updating the SoS capability can be decided, as shown in block 154. In this regard, it can be decided if the alternate workflow is a small deviation (e.g., one or two activities) from the nominal workflow or a significant deviation from the nominal workflow. If the scope is a small deviation, the nominal workflow can then be amended with the additional activity. Otherwise, if the scope is a significant deviation, the alternate workflow may merit an extended use case.

After deciding an approach for updating the SoS capability one or more SoS states or modes (e.g., on, off, ready, etc.) can be identified, as shown in block 156. If only one expected state exists at the SoS level, all use cases can be checked to ensure that they support the state. Otherwise, a candidate list of SoS states can be developed based upon customer documents or other sources or system experience, domain knowledge, framework/patterns, business rules, and/or program constraints such as reuse, legacies, and minimum technology maturation levels. For example, a candidate list of SoS states can be developed by looking for similar types of activities such as idle, ready, active, post-use analysis, training, degraded, emergency, backup, wartime, or peacetime. The states supported by a use case can then be recorded in the mission/enterprise worksheet. In addition to developing a candidate list of SoS states, the events that trigger a transition from one state to another can be identified.

From the mission/enterprise worksheet, then, a SoS statechart diagram can be created, as shown in block 158. Then, the activity diagrams can be updated with the SoS state information, as shown in block 160. In this regard, each use case's nominal and alternate workflow black-box activity diagrams can be updated with a precondition (state of the object at the start of the workflow) and a post condition (state of the object at the end of the workflow). The precondition can be displayed at the top of the swim lane, with the post condition displayed at the bottom of the swim lane. And in one embodiment, only preconditions that differ from the nominal workflow need be depicted for the alternate workflows. Further, also after creating the SoS statechart diagram, the use case descriptions can be updated with the SoS state information, as shown in block 162. More particularly, the use case descriptions can be updated with the respective preconditions, post conditions, and triggers, where the triggers may be the actions upon the system that begins execution of the respective use cases.

Thereafter, an anatomy use case diagram can be created, as shown in block 164. In this regard, the mission/enterprise use case goals that can be illustrated at the top of the anatomy use case diagram. Using the SoS use case diagram and the mission/enterprise worksheet, then, the SoS-level use cases can be added to the anatomy use case diagram, with lines drawn to show which use case goals are supported by the SoS use cases. Also, a logical decomposition class diagram can be created, such as by assuming the bounded SoS is a logical object (abstraction of one or more real world entities) as shown in block 166. In creating the logical decomposition class diagram, the SoS logical object can be included as the highest-level object where, at the SoS level, the diagram may be expected to only have one logical object. The logical decomposition class diagram can subsequently be modified to include one or more lower levels of the complex system 10, such as a system level 16, subsystem level 14 or the like, thereby permitting each lower level of the complex system to be developed (see blocks 22, 24 and 26 of FIG. 2) based upon a logical decomposition of the preceding, higher level.

In addition to creating an anatomy use case diagram and a logical decomposition class diagram, an actor class diagram can be created, as shown in block 168. The actor class diagram can graphically illustrate the previously identified SoS value recipients, as well as the SoS actors and any relationships between the value recipients and the actors. Then, each use case can be analyzed to identify a test and evaluation (T & E) strategy, as shown in block 170. In identifying a T & E strategy, a systems engineer or other user can review a customer's test and evaluation master plan (TEMP), as well as each SoS use case. The T & E strategy, such as the T & E phase, verification technique, test concept and/or resources, can then be narrated in the use case descriptions.

In addition to identifying a T & E strategy, each use case can be analyzed to identify an acquisition and build strategy, as shown in block 172. An incremental SoS capability strategy can then be developed for delivery of use case functionality that matches one or more program milestones and a program cost profile. In this regard, the program milestones can comprise designated points in the program schedule, while the program cost profile can comprise a cost per phase or per year of the program. Risk assessment can then be performed on each SoS use case, as shown in block 174. In assessing risk, cost, schedule and/or performance risks can be assessed in any of a number of different manners using, for example, the risk management database. For an example of a technique by which risk could be assessed in accordance with embodiments of the present invention, see Washington State Department of Information Services, *Project Management Framework—Risk Management Plan* (visited Aug. 30, 2004) <http://www.dis.wa.gov/pmframework/planning/riskmgmt.htm>, the contents of which are hereby incorporated by reference in its entirety. Thereafter, the SoS use cases can be reviewed and reprioritized, as shown in block 176. In this regard, the order by which the use cases and their activity diagrams are decomposed to the system level can be determined. The SoS use cases can be reviewed, for example, based upon the T & E strategy, acquisition and build strategy, and/or assessed risk. The SoS use cases can then be reprioritized, for example, with a value of low, medium, or high based on the risk in the use case descriptions.

B. Develop Functional Architecture

Again referring to FIG. 5, after performing SoS functional analysis (block 44), a SoS-level functional architecture can be developed, as shown in block 46. The SoS-level functional architecture can be developed in any of a number of different manners, but in one embodiment, the functional architecture is developed in accordance with the method illustrated in FIG. 13. As shown in block 178, a method of developing a SoS-level functional architecture includes establishing a set of system logical object candidates, where system logical objects can include, for example, abstract classes of domain systems, subsystems, interfaces, and data maps. To establish a set of system logical object candidates, an initial set of system logical objects can be identified, such as based on domain knowledge. If provided by the customer, systems that are included in the SoS 10 can be identified and expressed as system logical object classes, with a functional description of customer-specified systems provided in the class descriptions of the system logical objects. Also, additional logical objects can be identified based on system experience, domain knowledge, framework/patterns, reference models, business rules, and/or program constraints such as reuse, legacy, minimum technology maturation levels, and/or technology roadmap. From the additional logical objects, additional system classes can be created. Then, one or more implicit functional attributes and implicit functional operations can be described for each system logical object.

After establishing a set of system logical object candidates, nominal workflows can be developed for each SoS use case black-box activity (by order of priority), and expressed as white-box activities, as shown in block 180. In this regard, nominal white-box steps can be identified for each SoS use case black-box activity, with any actions in the swim lanes of the actors external to the SoS 10 not included, if so desired. Then, a black-box activity analysis can be performed based upon system experience, domain knowledge, framework/patterns, business rules, and/or program constraints such as reuse, legacy, and/or minimum technology maturation levels. By performing such as black-box activity analysis, a functional workflow can be developed, the functional workflow describing how each black-box activity is accomplished. The analysis can therefore be expressed in a white-box activity diagram using white-box activities or actions (invisible activities/actions to the actors external to the SoS and visible activities/actions to the actors at the system level). Each white-box step is an interaction between an actor and an object, or between objects within the SoS. In the white-box activity diagram, each white-box step can be placed in the appropriate swim lane for the performing actor or system logical object, where actors at the system level may be identified to complement the actors external to the SoS. Then, in creating the white-box activity diagram, additional system classes can be created if additional system logical objects are identified.

With the white-box activities, the use case descriptions can be updated by listing the white-box steps under a black-box step for which the respective white-box steps were created, as shown in block 182. Additionally, performance requirements for the white-box steps can be derived from the performance requirement of the respective black-box step. Next, system functionality can be allocated by associating white-box activities with actors and system logical objects, as shown in block 184. In allocating system functionality, a system worksheet can be created by listing the actors and system logical objects. All the white-box activity diagrams can then be reviewed, with the included white-box steps recorded into the system worksheet by placing the white-box steps in a column headed by the appropriate actor or system logical object. For each system logical object, then, the white-box steps can be compared to the descriptions of implicit functional operations and attributes. Under each system logical object, the white-box steps can be checked to ensure the white-box steps are appropriate and that the white-box steps describe complete functionality. Otherwise, the system worksheet can be updated with new white-box steps. Then, if new white-box steps are added, the appropriate white-box activity diagram and use case description can be updated. Also, under each actor in the system worksheet, any discrepancies can be reconciled between the white-box steps and the actor descriptors, e.g., service, actions, and attributes.

Also with the white-box activities, one or more system interfaces (system logical object interactions) can be described by creating a sequence diagram using the white-box steps, as shown in block 186. In this regard, the interaction flow between system logical objects needed to satisfy the white-box activity can be identified for each white-box activity diagram. The interaction flow can be checked to ensure the interaction flow is in a nominal time sequence. In addition, the sequence diagram can be analyzed to determine if assignment of functionality is improper or unbalanced, such as by surveying the interface needs for each system logical object. Then, if necessary, white-box allocation can be reassigned to the system logical objects.

After creating a sequence diagram, a collaboration diagram can be created to describe one or more collaborations between system logical objects, as shown in block 188. More particularly, the sequence diagram can be transformed into a collaboration diagram. The collaboration diagram can then be analyzed to determine if assignment of functionality is improper or unbalanced, such as by surveying the interface needs for each system logical object. The constraints associated with each system logical object can be reviewed or otherwise checked to ensure the interface definition does not contradict the constraints. And similar to before, if necessary, white-box allocation can be reassigned to the system logical objects.

Also in developing the SoS-level functional architecture, a system logical interface class diagram can be created to illustrate the interfaces of the system logical objects among themselves and the actors external to the SoS 10, as shown in block 190. Then, the interface classes of the system logical interface class diagram can be updated with interface information from each collaboration diagram, as shown in block 192. Similar to the collaboration diagram, the system logical interface class diagram can be analyzed to determine if assignment of functionality is improper or unbalanced, such as by surveying the interface needs for each system logical object. Likewise, the constraints associated with each system logical object can be reviewed or otherwise checked to ensure the interface definition does not contradict the constraints, with white-box allocation reassigned to the system logical objects if necessary.

In addition, missing functionality for the system logical objects can be determined, such as by determining missing functionality in the white-box activity steps of the system logical objects, as shown in block 194. To determine such missing functionality, each white-box step can be checked to determine if the white-box step has been under-specified, typically meaning that the actions presented do not provide any additional information or insight into the requirements. If any white-box step has been under-specified, that white-box step can be replaced with two or more detailed white-box steps, and the system worksheet can be updated. Similar to determining missing functionality, over-specified functionality can be determined for the system logical objects, such as by determining over-specified functionality in the white-box activity steps of the system logical objects, as shown in block 196. Likewise, each white-box step can be checked to determine if the white-box step has been over-specified, typically meaning that the actions are not visible at the system level. Any over-specified functionality can be combined into the appropriate level of functionality at the system level by grouping white-box steps of similar functionality. The system worksheet can then be updated.

Thereafter, system-level use cases can be determined or otherwise identified from one or more white-box activity groupings, as shown in block 198. In this regard, for each system logical object in the system worksheet, the white-box steps can be grouped into a similar group that identifies a common service, the groupings being intended to best capture the intent of the white-box steps at the current level of decomposition. Next, the appropriate white-box activity diagrams can be updated based upon the changes or updates made to the system worksheet, as explained above. The white-box activity diagrams can be reviewed to identify the actors (external to the SoS 10 or at the system 16 level) that interact with the activities that make up the respective common service, with the identified actors then being listed in the system worksheet. The use case name associated with each service can also be identified and added to the system worksheet. As will be appreciated, by determining the system-level use cases in this manner, the requirements (services) for each lower-tiered system element that best capture the intent of the expanded and collapsed white-box steps can be identified at the current level of decomposition. Thus, the resultant services (e.g., eight to twelve services) can be considered the functionality allocated to the next-lower level system element.

To conclude development of the SoS-level functional architecture (see block 46 of FIG. 5), a system context class diagram can be created, as shown in block 200. In creating such a system context class diagram, information from the collaboration diagrams containing the white-box detail can be aggregated. Then, the attributes, operations, and textual descriptions of the system logical objects can be updated with that information. In addition, the textual descriptions of the system logical objects can be updated with the derived performance requirements of their associated white-box steps.

C. Account for Quality Attributes in Functional Architecture

Figure 5:
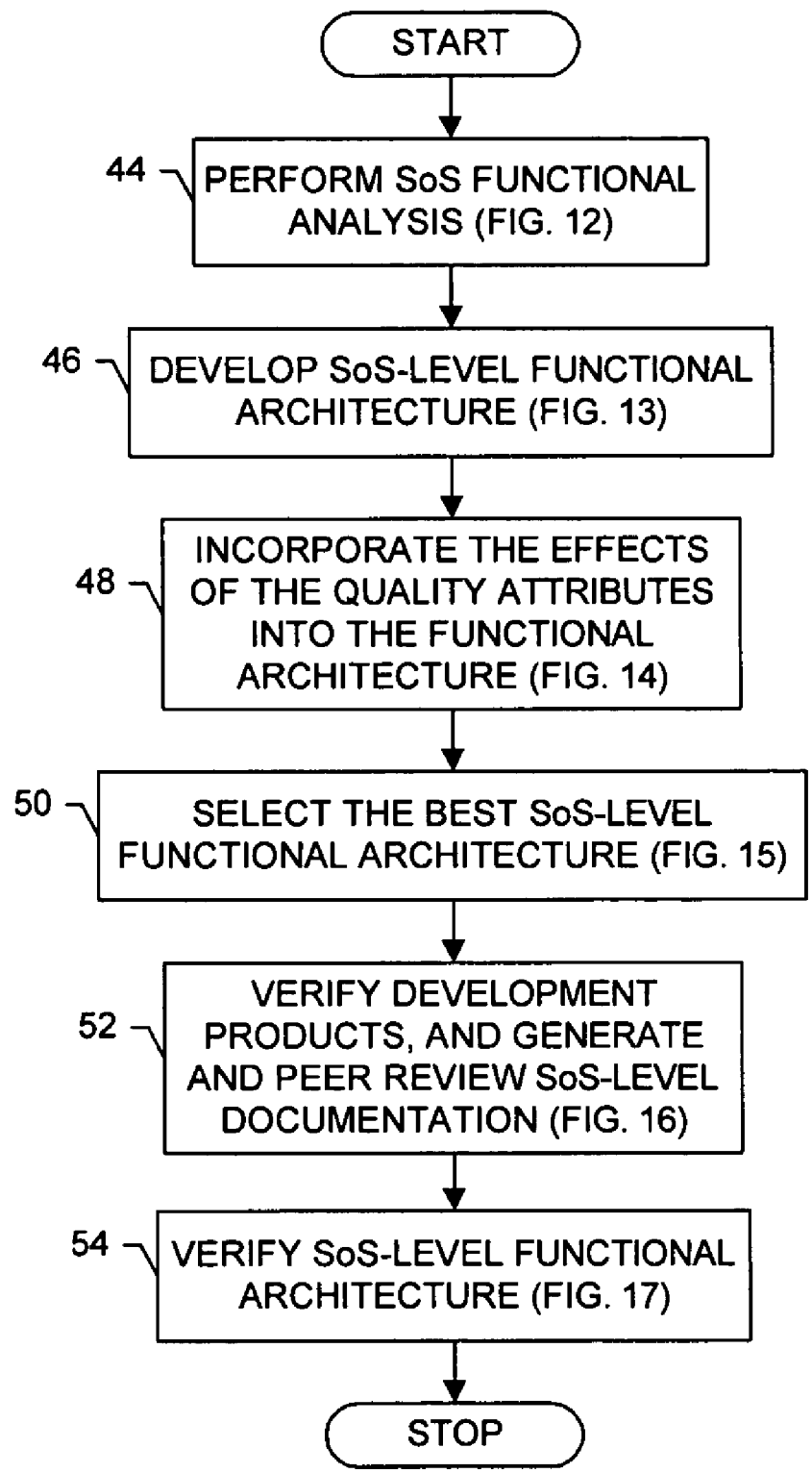
Figure 14:
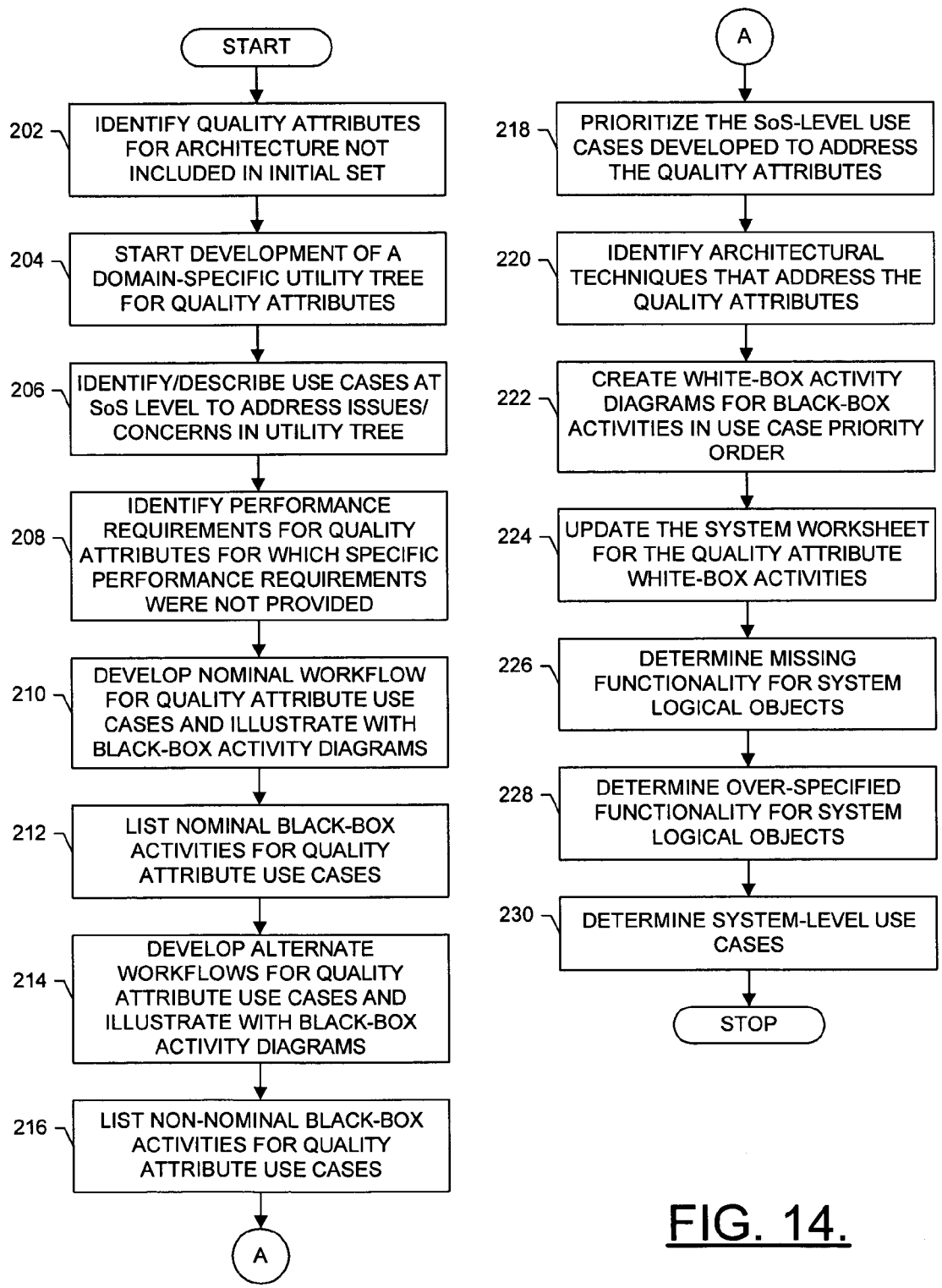

Next, after developing the SoS-level functional architecture, the effects of the quality attributes can be incorporated into or otherwise accounted for in the functional architecture, as shown in block 48 of FIG. 5. In this regard, one method of incorporating the effects of the quality attributes is illustrated in FIG. 14. As shown in block 202, the method of one embodiment includes identifying the quality attributes/characteristics that are important for the functional architecture that were not otherwise included in the initial set of quality attributes, such as based upon the CDD, CPD, CRD and/or a domain technical reference model (TRM). More particularly, the quality attributes/characteristics that shape or influence the architecture and are most central to the system's success can be identified. As will be appreciated, network-centric operations (NCO) is inherent to system of systems, and as such, interoperability is one of the more important quality attributes at the SoS level. And with the exception of attributes such as manufacturability, deployability, vulnerability, survivability, and environmental suitability (shock, vibration, humidity, temperature, etc.), one or more of the quality attributes can be based upon those found in International Organization for Standardization Standard ISO/IEC 9126, entitled: *Software Engineering—Product Quality*, the contents of which are incorporated herein in its entirety.

After identifying the quality attributes/characteristics that are important for the functional architecture that were not otherwise included in the initial set of quality attributes, development of a domain-specific utility tree for the quality attributes can be started, as shown in block 204. More particularly, the most important quality attributes/characteristics can be identified, and thereafter broken down into their sub-characteristics. Next, domain-specific issues/concerns for each of these sub-characteristics can be identified. A utility tree that permits all stakeholders to agree on a priority of the quality attributes as well as identify possible trade-offs can then be created or otherwise constructed, the domain tree including the identified domain-specific issues/concerns. In this regard, defining relevant quality attributes through an evaluation process can reduce, if not remove, ambiguity from so-called hidden requirements and provide a framework for achieving these attributes.

Thereafter, as shown in block 206, SoS-level use cases can be identified and described to address each of the identified domain-specific issues/concerns in the domain-specific utility tree. Use case descriptions can then be created for each of the SoS-level use cases, the use case descriptions including associated performance requirements. In addition, performance requirements can be identified for the quality attributes for which specific performance requirements were not otherwise provided, as shown in block 208. In this regard, domain experts can be surveyed or interviewed in any of a number of different manners to determine a performance value that is associated with the quality attribute requirements. For more information on one example technique whereby domain experts can be surveyed or interviewed, see Kathryn A. Kulick, Technical Performance *Measurement—A Systematic Approach to Planning, Integration, and Assessment* (1997-98)<http://www.acq.osd.mil/pm/tpm/kulick.htm>, the contents of which are hereby incorporated by reference in its entirety.

Next, similar to before, a nominal workflow can be developed for each quality attribute use case, and illustrated with a black-box activity diagram including a series of black-box activities performed by the SoS 10 and the actors external to the SoS, as shown in block 210. Likewise, the black-box activities for each quality attribute use case can be listed, as shown in block 212. In this regard, from the nominal activity diagram (i.e., black-box activity diagram) for each quality attribute use case, the black-box activities can be listed with their associated actor in order of logical sequence in the use case description. The use case descriptions can then be updated with the black-box steps. Also, performance requirements for the black-box steps can be derived from the use case's performance requirements, also in a manner similar to before.

After listing the black-box activities for each quality attribute use case, alternate workflows can be developed for each quality attribute use case, such as in the same manner as before with respect to the SoS use cases, as shown in block 214. In this regard, the alternate workflows can be developed and illustrated with a black-box activity diagram including a series of black-box activities performed by the SoS 10 and the actors external to the SoS. Thereafter, non-nominal black-box activities can be listed for the quality attribute use cases, as shown in block 216. More particularly, alternate and exception paths can be listed for each of the quality attribute use cases. The use case descriptions can then be updated with the black-box steps. And in a manner similar to before, performance requirements for the black-box steps can then be derived from the use case's performance requirements.

Next, the SoS-level use cases previously developed to address the quality attributes can be prioritized (e.g., low, medium, high), such as by importance to the SoS 10 and perceived risk in achieving the respective goals, as shown in block 218. Also, architectural techniques that address the previously identified quality attributes can be identified, such as based upon domain knowledge, as shown in block 220. Then, white-box activity diagrams can be created for each black-box activity in order of use case priority, where the white-box activity diagrams are created based upon the identified architectural techniques, as shown in block 222. The system worksheet can then be updated for the quality attribute white-box activities, as shown in block 224. More particularly, for example, the list of actors and system logical objects at the top of one or more columns in the worksheet can be updated. Also, the white-box activity diagrams can be reviewed, with the white-box steps recorded into the system worksheet, such as by placing the white-box steps in a column headed by the appropriate actor or system logical object.

Again, missing functionality for the system logical objects can be determined, such as by determining missing functionality in the white-box activity steps of the system logical objects, as shown in block 226. As before, each white-box step can be checked to determine if the white-box step has been under-specified, with any under-specified white-box steps being replaced with two or more detailed white-box steps, and the system worksheet being updated. Also as before, over-specified functionality can be determined for the system logical objects, such as by determining over-specified functionality in the white-box activity steps of the system logical objects, as shown in block 228. Likewise, each white-box step can be checked to determine if the white-box step has been over-specified, with any over-specified functionality being combined into the appropriate level of functionality at the system level by grouping white-box steps of similar functionality. Likewise, the system worksheet can then be updated.

Thereafter, system-level use cases can again be determined or otherwise identified from one or more white-box activity groupings, as shown in block 230. More particularly, for each system logical object in the system worksheet, the white-box steps can be grouped into a similar group that identifies a common service, the groupings being intended to best capture the intent of the white-box steps at the current level of decomposition. Next, the appropriate white-box activity diagrams can be updated based upon the changes or updates made to the system worksheet, as explained above. In this regard, as before, the white-box activity diagrams can be reviewed to identify the actors (external to the SoS 10 or at the system 16 level) that interact with the activities that make up the respective common service, with the identified actors then being listed in the system worksheet. The use case name associated with each service can also be identified and added to the system worksheet. Also as before, the resultant services (e.g., eight to twelve services) can then be considered the functionality allocated to the next-lower level system element.

D. Select Best Functional Architecture

Figure 15:
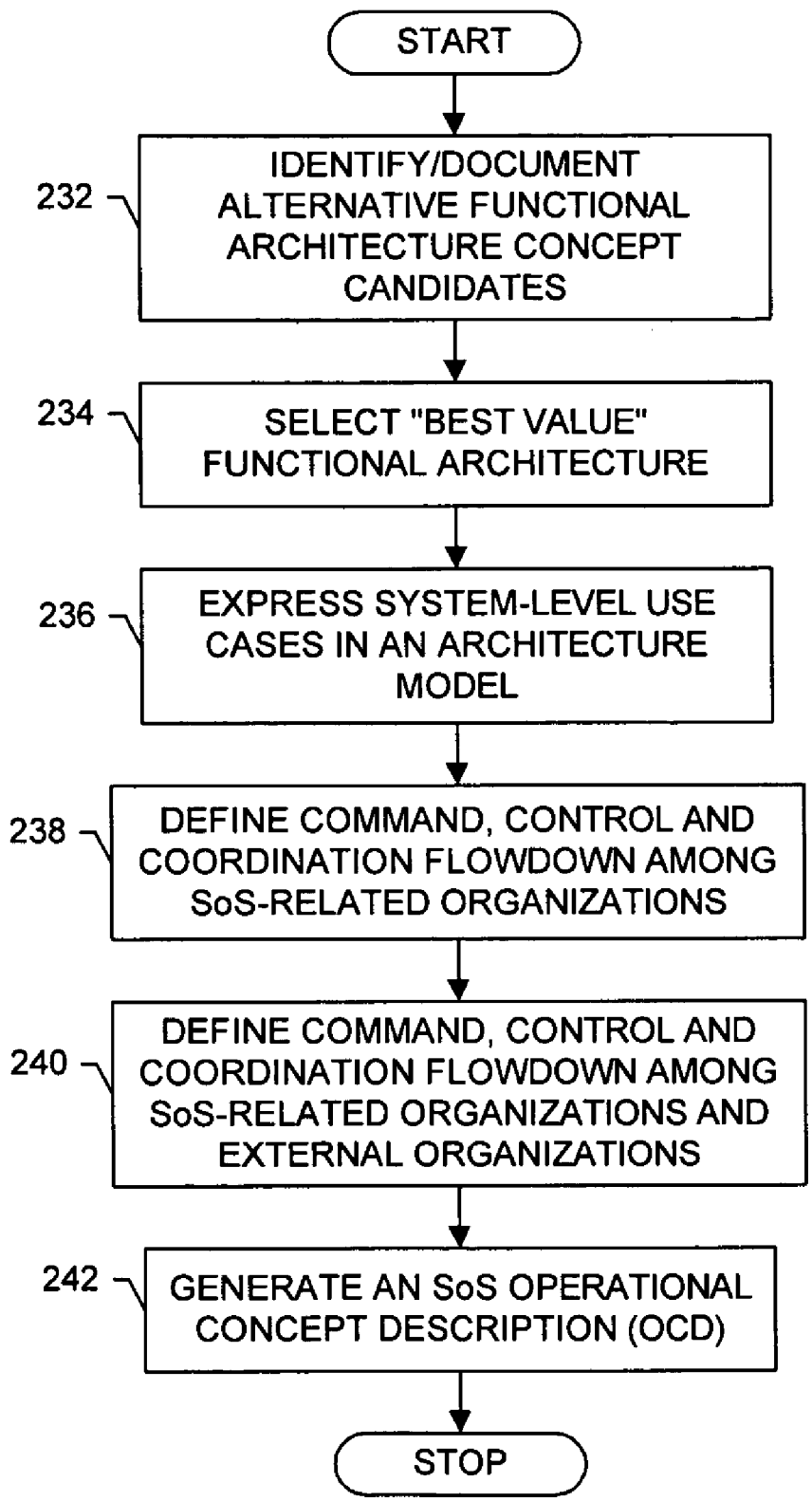

Referring back to FIG. 5, after incorporating the effects of the quality attributes into the functional architecture (see block 48), the best SoS-level functional architecture can be selected, as shown in block 50. In this regard, a method of selecting the best functional architecture in accordance with one embodiment of the present invention is illustrated in FIG. 15. In accordance with the method of FIG. 15, one or more alternative functional architecture concept candidates can be identified and documented by moving between logical objects, as shown in block 232. More particularly, in the system worksheet, one or more alternate use case and logical object pairings can be generated, where the pairings can apply domain knowledge of framework and patterns such as directed, collaborative, centralized, distributed and/or autonomous patterns. Then, each different use case and logical object set can be identified as an alternative functional architecture, with a system worksheet thereafter created for each of the alternative architectures.

After identifying and documenting one or more alternative functional architectures, a "best value" functional architecture can be selected, such as by performing functional analysis trade studies, as shown in block 234. The best value functional architecture can be selected in any of a number of different manners. For example, the characteristics of each of the functional architectures can be described in terms of trade study evaluation criteria and translated into a quantitative value. Trade studies can then be performed based upon the trade study evaluation criteria. For information on one technique whereby such trade studies can be performed, see DoD Systems Management College, *Systems Engineering Fundamentals* (2001) 112-116, available at <http://www.dau.mil/pubs/pdf/SEFGuide %2001-01.pdf>, the contents of which are hereby incorporated by reference in its entirety. The best value functional architecture can then be selected based upon the trade studies. Once the best value functional architecture has been selected, the SoS use case diagram can be updated with the quality attribute use cases of the selected best value functional architecture. Likewise, the white-box activity diagrams, white-box sequence diagrams, white-box collaboration diagrams, and the system logical interface class diagram can be updated based upon the selected best value functional architecture, or more particularly based upon any changes in functionality allocation between system logical objects from the initial functional architecture to the best value functional architecture. In addition, the system context class diagram can be updated with the selected functionality for the system logical objects. The system worksheet associated with the best value functional architecture can then be checked to verify that the respective system worksheet reflects the selected functional architecture.

After selecting the best value functional architecture, the system-level use cases can be expressed in an architecture model, as shown in block 236. More particularly, from the system worksheet, system-level use cases can be created in an architectural model using their respective use case descriptions. Next, command, control and coordination flow down can be created among SoS-related organizations to define SoS boundaries, as shown in block 238. In creating the command, control and coordination flow down, a SoS command and control flow down class diagram can be created, where the SoS command and control flow down class diagram captures the operational command structure in a hierarchy of classes for the purpose of expressing the command and control flow down. In this regard, the SoS command and control flow down class diagram can be created based upon the mission/enterprise context class diagram, the SoS context class diagram, the SoS logical interface class diagram, and the actor class diagram.

After creating the SoS command and control flow down class diagram, the command, control and coordination data flows among SoS-related organizations and external organizations can be defined, as shown in block 240. For example, the command, control and coordination data flows can be defined by creating a SoS command and control information exchange matrix based upon an applicable memorandum of understanding (MOU) between command entities, the CRD, CDD, CPD and/or ICD. The SoS command and control information exchange matrix can capture all architecturally-significant dependencies between the SoS-related organizations and external organizations for the purpose of expressing the command and control relationships in an operational view. At the commander level, for example, such dependencies may be reflected in the MOUs that exist, or should exist, between two command entities.

To finish the method of selecting the best SoS-level architecture (see block 50 of FIG. 5), an SoS operational concept description (OCD) can be generated, as shown in block 242. The OCD can be generated in a number of different manners to include an overview of the proposed SoS 10, operational and functional descriptions of the SoS, the users, and the operational scenarios. In this regard, the OCD can be generated based upon the use case diagrams and descriptions, doctrine documents, actor class diagram, MDM, mission objectives, user organization, operational characteristics, and/or external interfaces.

E. Verify Development Products, Generate/Peer-Review Documentation

Figure 16A:
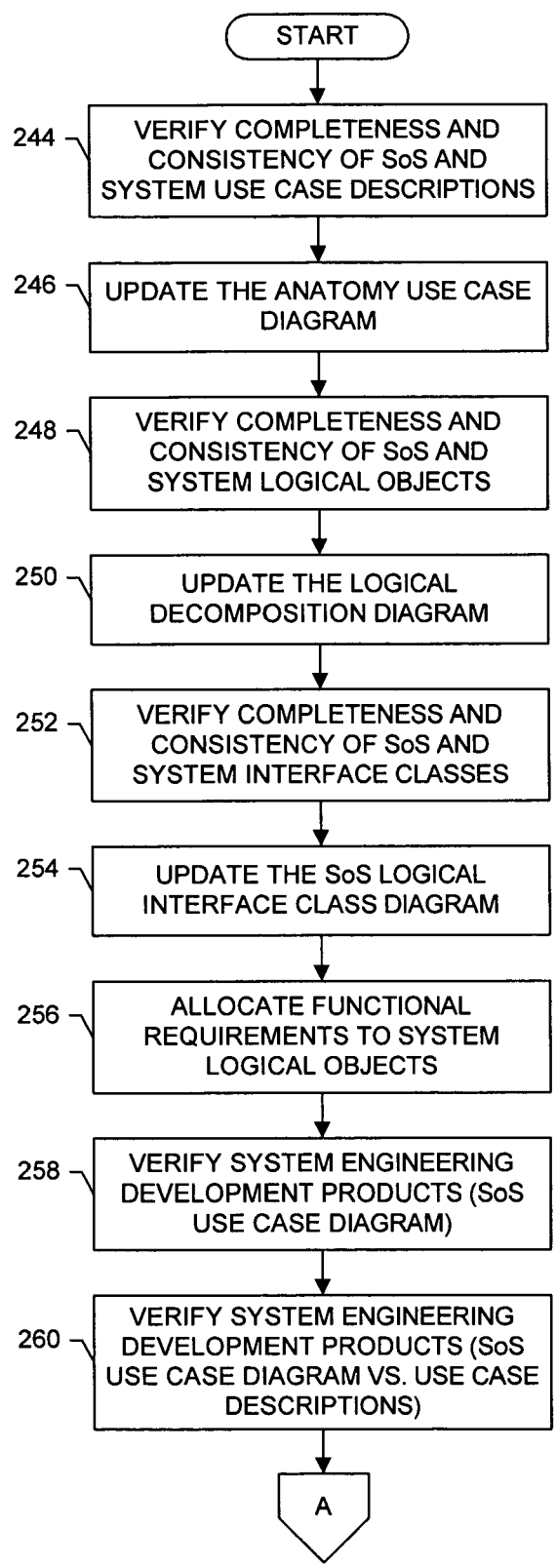
Figure 16B:
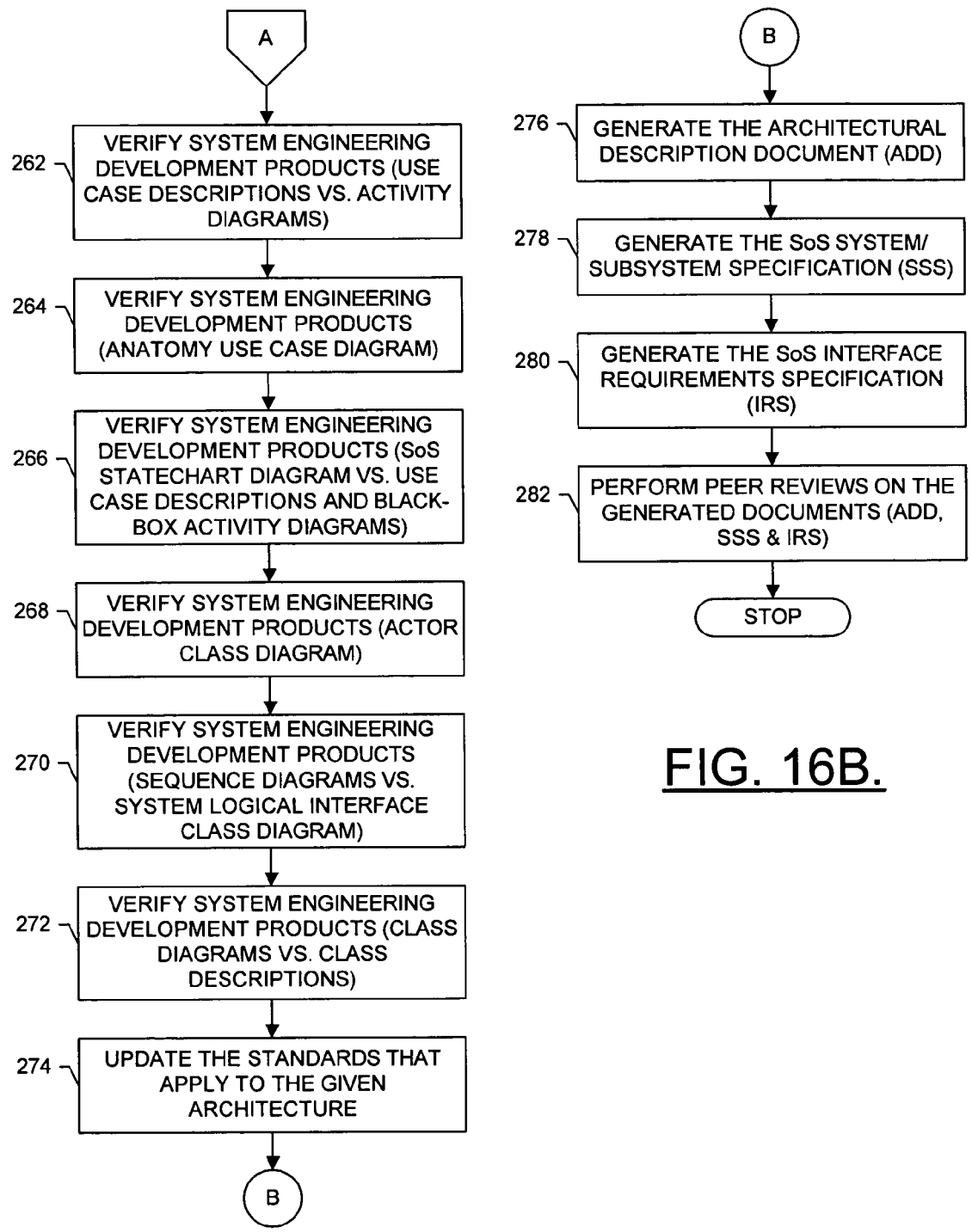

Referring again to FIG. 5, after selecting the best SoS-level functional architecture, the development products can be verified, and peer review SoS-level documentation can be generated, as shown in block 52. A method of verifying development products and generating peer review SoS-level documentation in accordance with one embodiment of the present invention is illustrated in FIGS. 16A and 16B. As shown in block 244, the method can include verifying the completeness and consistency of the SoS and system use case descriptions, as well as verifying the consistency of the use cases, requirements management database and risk management database. Then, the anatomy use case diagram can be updated, as shown in block 246. In this regard, the consistency between the SoS 10 and system 16 levels can be verified by mapping the SoS-level use cases to their child system-level use cases. To verify the consistency using the system worksheet, a unique identifier associated with each white-box can be traced to a parent black-box step to provide downward and upward traceability of functional requirements and their associated performance requirements.

Also, completeness and consistency of the SoS and system logical objects can be verified, such as by checking the architecture model to ensure that all the SoS and system logical object descriptions are complete and consistent, as shown in block 248. Then, the logical decomposition class diagram, which provides the decomposition from the SoS-level logical object to the system-level logical objects, can be updated, as shown in block 250. More particularly, the consistency between the SoS 10 and system 16 levels can be verified by mapping the SoS-level logical object to its child system-level logical objects, such as in a manner based upon a list of system-level classes.

Completeness and consistency of the SoS and system interface classes can also be verified, such as to ensure that all the SoS and system interface class descriptions are complete and consistent, as shown in block 252. Thereafter, the SoS logical interface class diagram can be updated. More particularly, for example, from the SoS logical interface class diagram, the interface information between the logical SoS and its actors can be updated to the level of detail that was generated in the white-box collaboration diagrams, as shown in block 254. Then, using the system worksheet as a reference, the functional requirements in the requirements management database can be allocated to the system logical objects listed in the system logical interface class diagram, as shown in block 256. Also, the performance requirements can be allocated to the system logical objects.

Along with verifying the completeness and consistency of the SoS and system logical objects, and the SoS and system interface classes, a number of system engineering development products can be verified. For example, as shown in block 258, the SoS use case diagram can be verified. In this regard, the SoS use case diagram can be verified to ensure that the use case names and actor names are at the same level of abstraction (detail), and/or to ensure that the use case name consists of an active verb followed by a measurable noun indicating the goal or value that the use case is providing to its actor, and is relevant to the customer. Also, the SoS use case diagram can be verified to ensure that the name of an actor is a noun, is relevant to the customer, and models a role, not a particular person; and to ensure all use cases lead to the fulfillment of exactly one goal for an actor, and that goal is clear from the use case name.

In addition, the SoS use case diagram can be verified in comparison to the use case descriptions, as shown in block 260. More particularly, the SoS use case diagram can be verified in comparison to the use case description to ensure consistency between the SoS use case diagram and the associated use case descriptions, and/or to ensure consistency among the use case descriptions. Also, all the use cases can be verified to ensure that the use cases are described at the same level of detail, and/or ensure that there are no superfluous use cases (i.e., use cases that are outside the boundary of the SoS 10, do not lead to the fulfillment of a goal for an actor, or duplicate functionality described in other use cases).

The use case descriptions can also be verified in comparison to the activity diagrams, as shown in block 262 of FIG. 16B. For example, use case descriptions and their supporting black-box and white-box activity diagrams can be verified for consistency, such as by checking black-box steps versus black-box activities, use case actors versus black-box actors, and/or use case states versus activity diagram preconditions/post conditions. In addition, the use case descriptions can be compared with the activity diagrams to determine if they represent the same concepts.

Further, the anatomy use case diagram can be verified, such as to ensure that all use case goals in the mission/enterprise goal use case diagram are at the top level of the anatomy use case diagram, as shown in block 264. The anatomy use case diagram can also be verified to ensure that all use cases in the SoS use case diagram are represented in the anatomy use case diagram and that each mission/enterprise use case goal is supported by at least one SoS-level use case. In addition, the anatomy use case diagram can be verified to ensure that all use cases in the system worksheet are represented in the anatomy use case diagram, that each SoS-level use case is supported by at least one system-level use case, and/or that a requirements management database traceability report is consistent with the anatomy use case diagram. In this regard, the requirements management traceability report can illustrate that a number of, if not all of, the lower-level requirements can be traced up to higher-level operational requirements.

The SoS statechart diagram can be verified in comparison to the requirements use case descriptions and the black-box activity diagrams, as shown in block 266. For example, the SoS statechart diagram can be reviewed to identify the states. More particularly, the statechart diagram and corresponding requirements description can be read to determine the possible states of the SoS object and events that cause the state changes. Also, the corresponding requirements description can be read and annotated where a concept is described or for any functional requirements in which the concept participates or is affected. In addition to reviewing the SoS statechart diagram, requirements descriptions of the different states, attribute values, or combinations of attribute values that can cause the SoS object to behave in a different way can be located. Further, the SoS statechart diagram can be reviewed against the requirements, such as to ensure that the states described are not duplicated, that the states are consistent with the requirements, and the transitions are consistent with the requirements. The SoS statechart diagram and the use case descriptions can also be verified for consistency, as can the SoS statechart diagram and the pre- and post conditions in the black-box diagrams.

In another instance of verifying the system engineering development products, the actor class diagram can be verified, as shown in block 268. In this regard, the actor class diagram can be verified to ensure that the value recipients on the mission/enterprise goal use case diagram are represented in the actor class diagram, and that the actors in the SoS use case diagram are represented on the actor class diagram. Also, the actor class diagram can be verified to ensure that each value recipient from the mission/enterprise goal use case diagram is shown in the actor class diagram as including one or more actors from the SoS use case diagram. As will be appreciated, such a relationship can be traced by using the anatomy use case diagram to see how the associated mission/enterprise goal use case is supported by SoS use cases. In addition, the actor class diagram can be verified to ensure that actors on the system-level black-box activity diagrams are represented on the actor class diagram, where such actors are external to the SoS 10 and represent a role refinement from an actor described at the SoS level.

Further, the sequence diagrams can be verified in comparison to the system logical interface class diagram, as shown in block 270. More particularly, the behaviors and relationships specified in the system logical interface class diagram and white-box sequence diagrams can be verified for consistency. Also, the white-box sequence diagrams can be verified to identify the objects, data interchanges, and constraints, such as by finding each distinct system object, class, and actors in each sequence diagram, finding each distinct message or service exchanged between system objects, and thereafter identifying restrictions on the number of classes/objects to which a message can be sent, global attributes values, data dependencies, time, message sending/receiving, sequencing, and acknowledgement constraints that affect the object state.

In addition, the white-box activity diagrams and the system logical interface class diagram can be compared for object, service, constraint consistency, and design reasonableness. In performing such as comparison, a consistency defect can be identified when an actor, class, or object cannot be found on the class diagram and such items must be represented in the system in order to provide the necessary behavior; or when there are services or messages on the sequence diagram that do not exist on the system logical interface class diagram. Also, a consistency defect can be identified when the sequence diagram implies that a behavior must exist, but no such behavior is recorded for the appropriate class on the system logical interface class diagram; or when the sequence diagram and system logical interface class diagram do not agree in data content, cardinality of messages between objects, the ranges of permissible data values, data and object dependencies, data constraints, or timing constraints that affect object state. An omission defect, on the other hand, can be identified when class behaviors do not address the higher-level services inferred by the sequence diagrams, when the class or object that receives the message on the sequence diagram is responsible for the service and does not have an associated behavior on the system logical interface class diagram, or when the service described by the sequence diagram is insufficient to achieve that service. Also, an omission defect can be identified when no class assumes responsibility for a particular service, when class diagram behaviors are missing without which the system service cannot be achieved, or when associations between classes that communicate with one another are missing.

Class diagrams can be verified in comparison to the class descriptions, such as to verify the class diagrams and their descriptions for consistency, as shown in block 272. Also, for example, the class diagrams can be reviewed to understand the properties of the classes in the system. In this regard, an omission defect can be identified when the class description cannot be found, such as when the class was represented but not described. And an ambiguity defect can be identified if the class description is ambiguous for use as a design model. In addition to reviewing the class diagrams, the attributes can be verified to ensure that all of the attributes are described along with basic types (i.e., types of class attributes). In such instances, a consistency defect can be identified when the same set of attributes are not in both the class description and diagram; an ambiguity defect can be identified when a class should not encapsulate all of the attributes otherwise assigned to the class; and an incorrect fact defect can be identified when the types assigned to the attributes are incorrect.

Also in verifying the class diagrams in comparison to the class descriptions, the behaviors and constraints can be verified to ensure that all of the behaviors and constraints are described. In such instances, a consistency defect can be identified when the same behaviors and constraints are not in both the class description and diagram in the same style or level of granularity to describe the behaviors. An ambiguity defect can be identified when a class cannot meaningfully encapsulate all of the assigned behaviors, or when constraints do not make sense for a class. An omission defect, on the other hand, can be identified when the class behavior is highly coupled to other class's attributes, or when constraints cannot be satisfied using the defined attributes and behaviors. In addition to verifying the behaviors and constraints, the class inheritance mechanisms can be verified, such as to identify any omission defects when the inheritance relationship is not included on the class description, or any ambiguity defects when the class behavior does not make sense at this point of the class hierarchy.

After verifying the system engineering development products, the standards that apply to the SoS architecture can be identified and updated for review, as shown in block 274. Also, an architecture description document (ADD) can be generated for review. The ADD can be generated to include the architectural information added/updated during the functional analysis explained above. More particularly, for example, the ADD can include a conceptual data model, functional process model, description of functional configurations, quality of data of current system, architecture guidelines, physical configurations, functional test strategy, reusable component functional specifications, and/or anticipated cost effectiveness, all of which are well known to those skilled in the art.

In addition to generating an ADD, a SoS system/subsystem specification (SSS) can be generated for review, as shown in block 278. The SSS can include all functional, non-functional and performance requirements for the SoS and the methods that can be used to ensure that each requirement is met. Further, a SoS interface requirements specification (IRS) can be generated for review, as shown in block 280. The IRS, then, can identify the interfaces between the system logical objects, and can also include additional information regarding the interfaces between the SoS and external systems. Then to conclude peer review of SoS-level documentation (see block 52 of FIG. 5), peer reviews can be performed on the generated ADD, SSS and IRS, such as in accordance with any of a number of different peer review processes, as shown in block 282. For more information on a technique whereby such peer reviews can be performed, see National Aeronautics and Space Administration (NASA), *General: The Peer Review Process* (visited Aug. 30, 2004)<http://pds.jpl.nasa.gov/documents/qs/peer_review.html>, the contents of which are hereby incorporated by reference in its entirety.

F. Verify Functional Architecture

Figure 17:
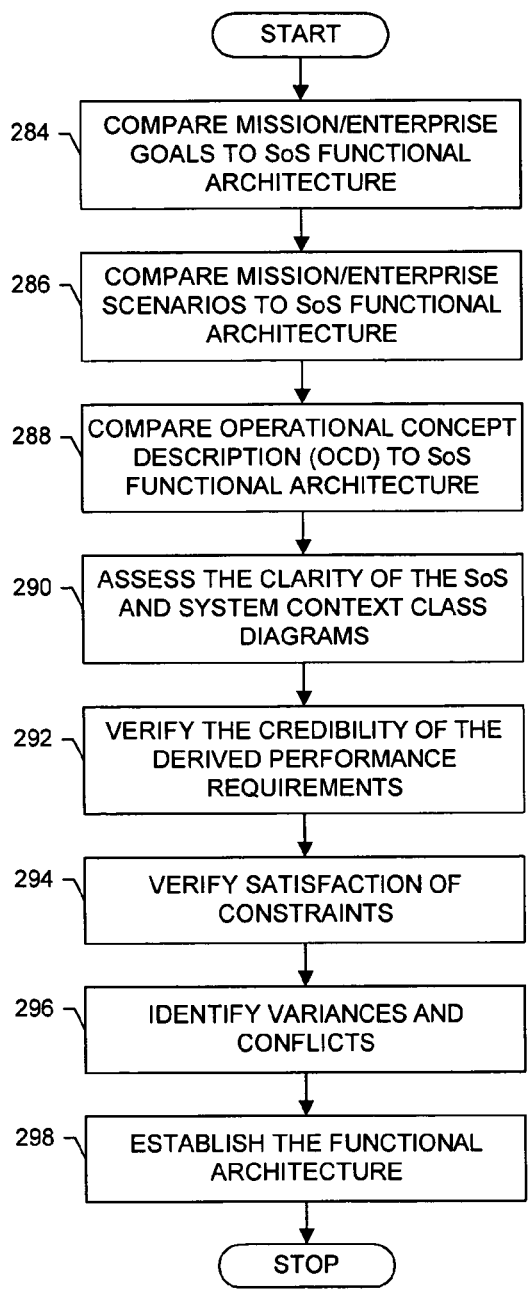

Referring once again to FIG. 5, after peer reviewing the SoS-level documentation, the SoS functional architecture can be verified, as shown in block 54. A method for verifying the SoS functional architecture in accordance with one embodiment of the present invention is illustrated in FIG. 17. As shown in block 284, the method can include comparing the mission/enterprise goals to the SoS functional architecture. More particularly, the mission enterprise goals can be compared to the ADD based upon domain knowledge to assess if the SoS functional architecture is compliant to the intent of the mission/enterprise goals. Also, again based upon domain knowledge, the mission/system scenarios can be compared to the SoS functional architecture, or more particularly the ADD, to assess if the SoS functional architecture is compliant to the intent of the scenarios, as shown in block 286. In addition, the OCD can be compared to the SoS functional architecture to assess if the SoS functional architecture is compliant to the intent of the concept, as shown in block 288.

The clarity of the SoS and system context class diagrams can be assessed, as shown in block 290. More particularly, the SoS context class diagram can be reviewed to ensure the SoS boundary is clearly defined and matches the technical statement of work, which can list the scope of work and the deliverables for the program for design of the SoS. Likewise, the system context class diagram can be reviewed or otherwise checked to ensure the system context class diagram reflects the next level of detail and does not alter the SoS level. Also, the credibility of the derived performance requirements can be verified, such as by assessing the credibility of each MOE or derived performance requirement based on the KPPs (key performance parameters), as shown in block 292.

In addition, the satisfaction of constraints can be verified based upon the ADD and the SSS, as shown in block 294. In this regard, the functional architecture can be checked to verify that the mandated non-functional requirements (e.g., quality attributes) and constraints (e.g., legacy systems, legacy interfaces, non-developmental items (NDI)/COTS) are included in the functional architecture. Also, any variances and conflicts can be identified, as shown in block 296. More particularly, any voids, variances and conflicts resulting from the aforementioned verification evaluation steps can be identified based upon the verification and validation results, the requirements management database, technical standards profile, architecture model, ADD, SSS and/or IRS. Thereafter, to conclude verifying the SoS functional architecture (see block 54 of FIG. 5) and thus the functional analysis (see block 30 of FIG. 3), the functional architecture can be established based upon any identified variances of functions and requirements and any functional verification exception reports or records, as shown in block 298. And as will be appreciated, the functional architecture can be developed in this manner for physical complex systems or logical complex systems, complex processes or the like, without departing from the spirit and scope of the present invention.

III. Synthesis

A. Identify Initial Physical Architecture

Figure 18:
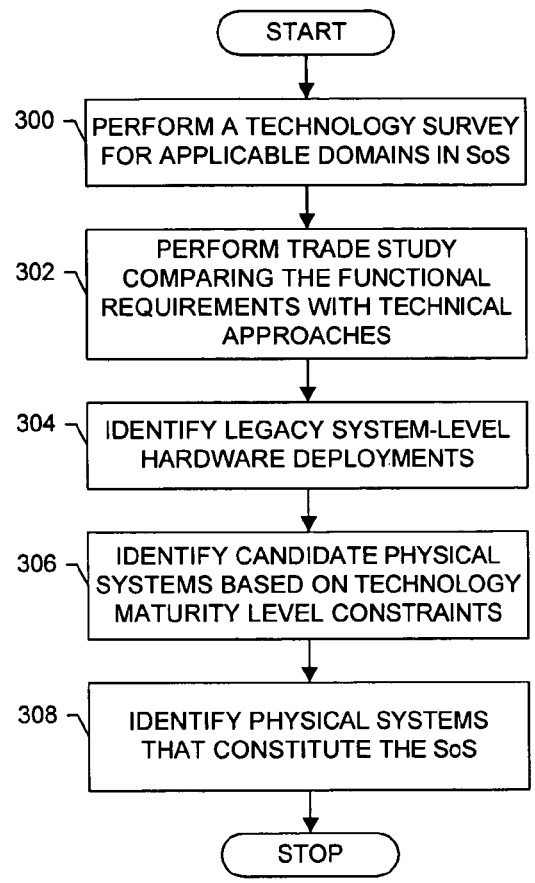
Figure 19:
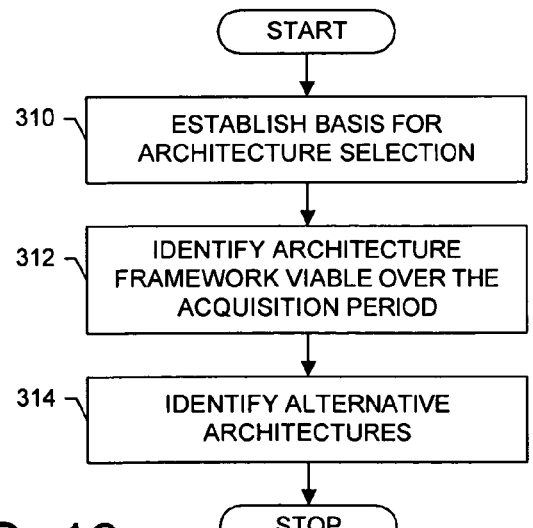

Referring back to FIG. 3, after performing the functional analysis, synthesis can be performed to establish or otherwise select a SoS-level physical architecture, as shown in block 32. More particularly with reference to FIG. 6, a method of performing synthesis can include identifying a SoS-level initial physical architecture, as shown in block 56. The SoS-level initial physical architecture can be identified in any of a number of different manners, such as in accordance with the method illustrated in FIG. 18. Referring now to FIG. 18, then, a method of identifying the SoS-level initial physical architecture includes performing a technology survey for one or more applicable domains in the SoS, such as by developing a technology roadmap, as shown in block 300. The technology roadmap can be developed in any of a number of different manners, such as based upon domain knowledge, business strategy, domain technology projections, advanced concept technology demonstrations (ACTDs), and/or insight into Science & Technology 6.1 (Basic Research), 6.2 (Applied Research), and 6.3 (Advanced Technology Development) programs, such programs being well known to those skilled in the art.

After performing the technology survey, a trade study can be performed to compare the function requirements with the technical approaches from the technology roadmap, as shown in block 302. In this regard, the trade study can be performed in any of a number of different manners, such as based upon the MOEs, technology roadmap, requirements management database, and/or functional architecture (system logical interface class diagram), such as in the same manner explained above. Thereafter, legacy system-level hardware deployments can be identified (when hardware or software is specified to reside in selected systems), as shown in block 304. An initial assembly component diagram can then be created with the legacy system hardware.

Also, with the results of the technology study and based upon the legacy systems in the initial assembly component diagram, candidate physical systems can be identified based upon technology maturity level constraints, as shown in block 306. In this regard, the selection of the technology making up the candidate physical system must typically be acceptable to technology maturity and risk issues. Thereafter, the physical systems that comprise the SoS can be identified based upon the list of candidate physical systems and the functional architecture (system logical interface class diagram), as shown in block 308. More particularly, system logical objects can be assigned to system physical objects to thereby allocate and assign events and states to physical objects. Next, for each logical system (e.g., objects and interfaces) in the functional architecture, the class attributes, operations, and descriptions can be reviewed, the initial physical architecture being identified based upon domain knowledge. The assembly component diagram that depicts the identified physical systems and their associations can then be updated to thereby perform physical decomposition of the identified physical systems.

B. Identify Alternative Physical Architecture Candidate(s)

Figure 6:
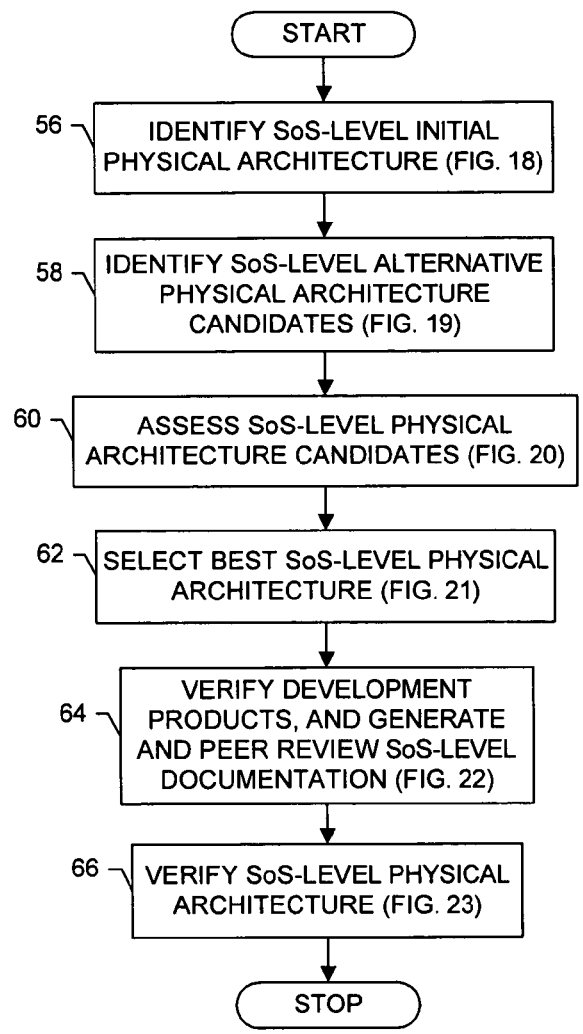
Figure 7:
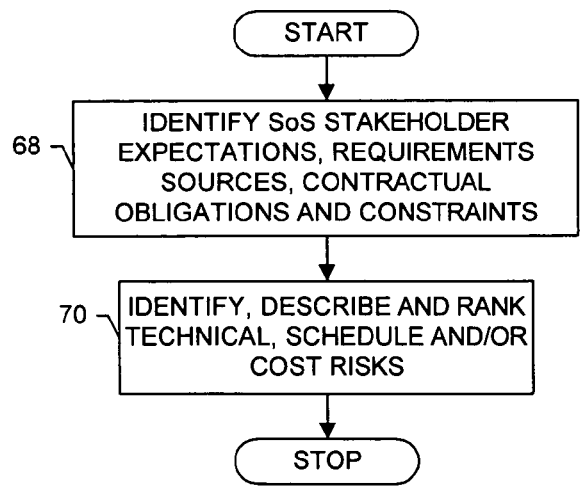
Figure 8:
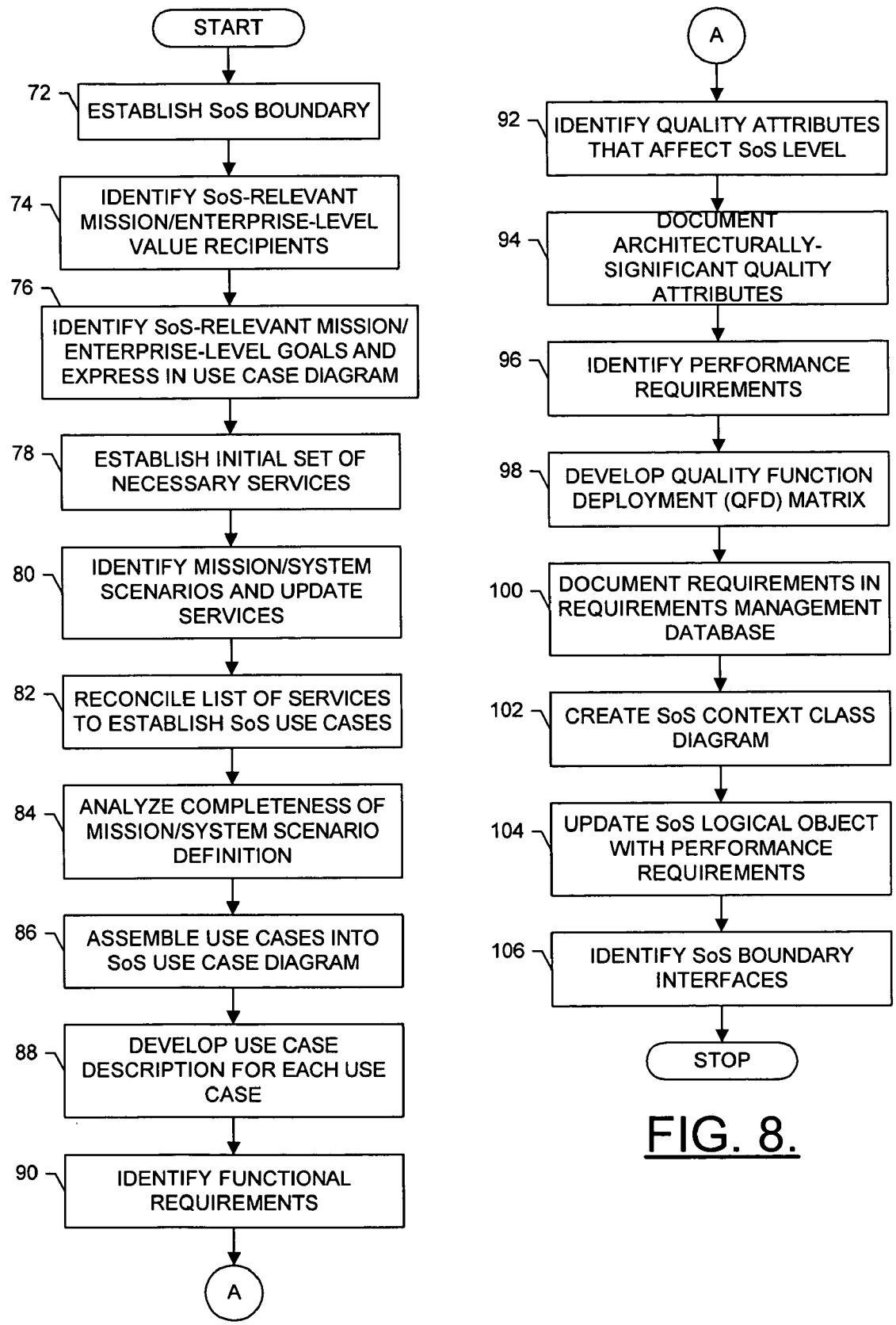
Figure 9:
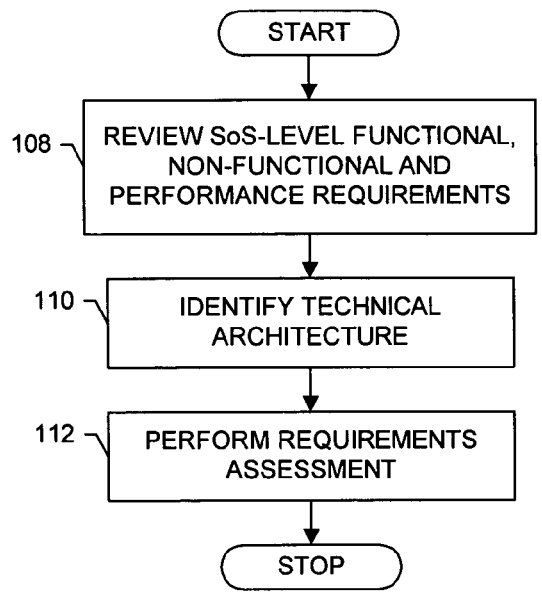
Figure 10:
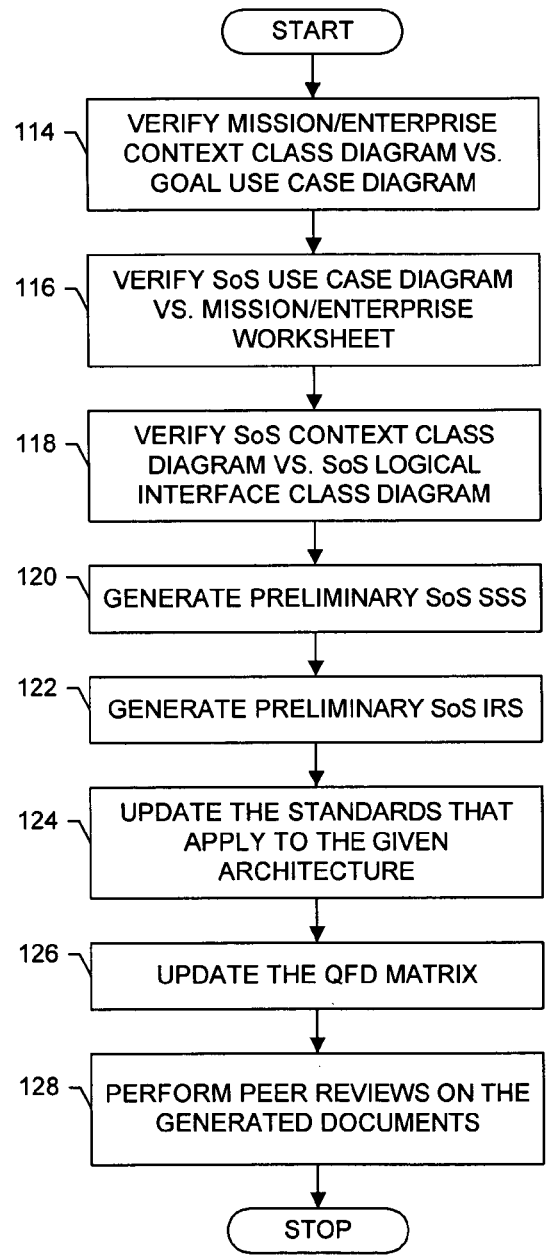
Figure 11:
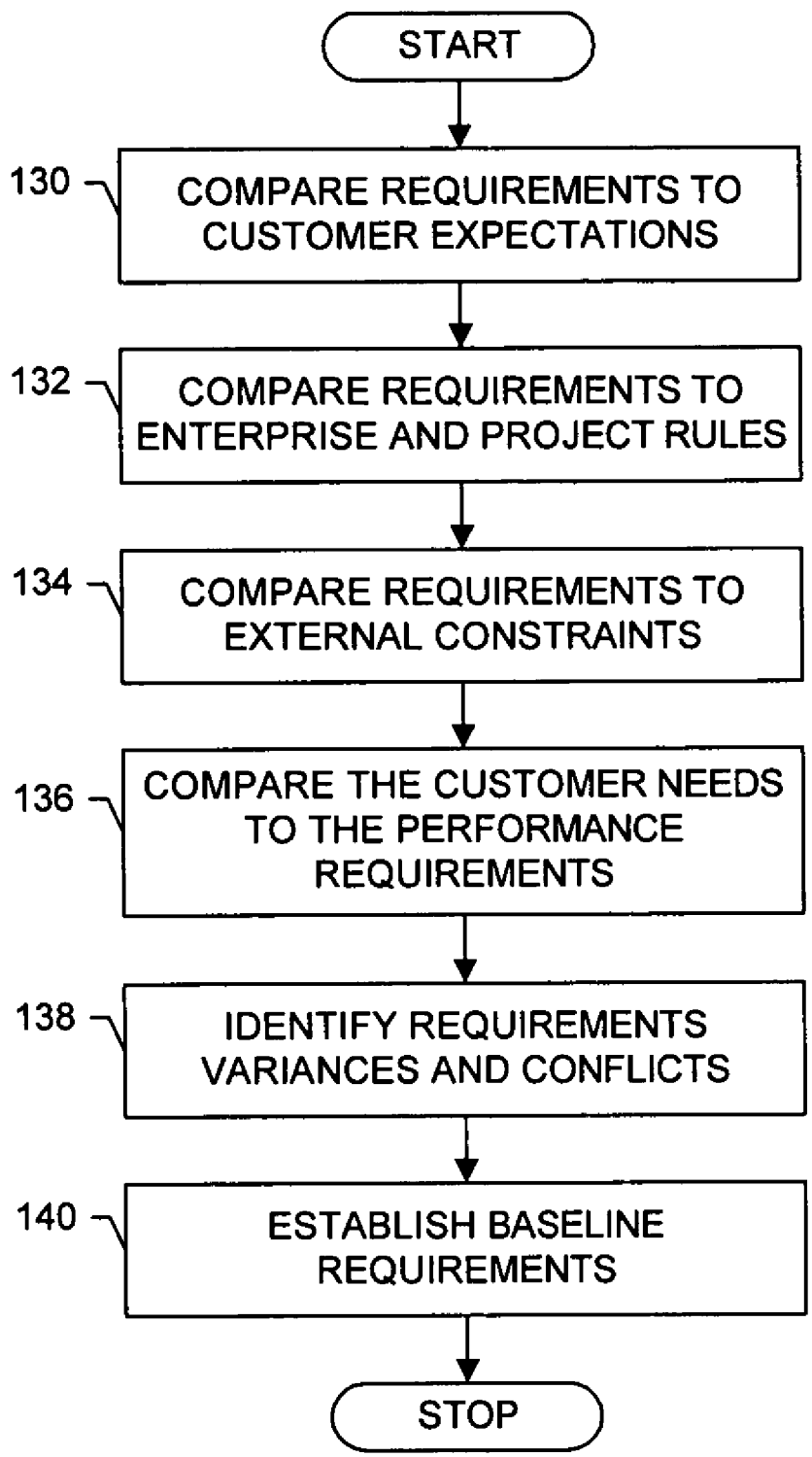

After identifying the physical systems that comprise the SoS 10, and thus the SoS-level initial physical architecture (see block 56 of FIG. 6), one or more SoS-level alternative physical architecture candidates can be identified, as shown in block 58 of FIG. 6. The SoS-level alternative physical architecture candidates can be identified in any of a number of different manners, such as in accordance with the method illustrated in FIG. 19. As shown in block 310 of FIG. 19, then, a method of identifying one or more SoS-level alternative physical architecture candidates can be identified by first establishing a basis for architecture selection. More particularly, the program risk assessment from the risk identification worksheet, including development risks, modification risks and life cycle risks and cost, can be reviewed to establish a basis for architecture selection.

After establishing a basis for architecture selection, an architecture framework that may remain viable over the acquisition period can be identified, as shown in block 312. More particularly, the customer roadmap and domain knowledge can be assessed to determine future capabilities/technologies that drive the architecture. The assessment can be described in the form of the capabilities and technologies projected into future years. As will be appreciated, by assessing the customer roadmap and domain knowledge, an architecture framework can be developed that is robust over the acquisition period and has the ability to accommodate and fully utilize the planned technology insertions. If the acquisition strategy is spiral development, the content of each spiral increment should be understood and fully coordinated with the customer. In this regard, the spirals may be relatively independent to reduce risk and maintain the desired schedule.

After identifying an architecture framework, one or more alternative physical architecture candidates can be identified, as shown in block 314. In this regard, for each logical system (e.g., objects and interfaces) in the functional architecture, the class attributes, operations, and description can be reviewed. Thereafter, one or more alternative physical architecture candidates can be identified on the basis of domain knowledge, and documented in an assembly component diagram.

C. Assess Physical Architecture(s)

Figure 20:
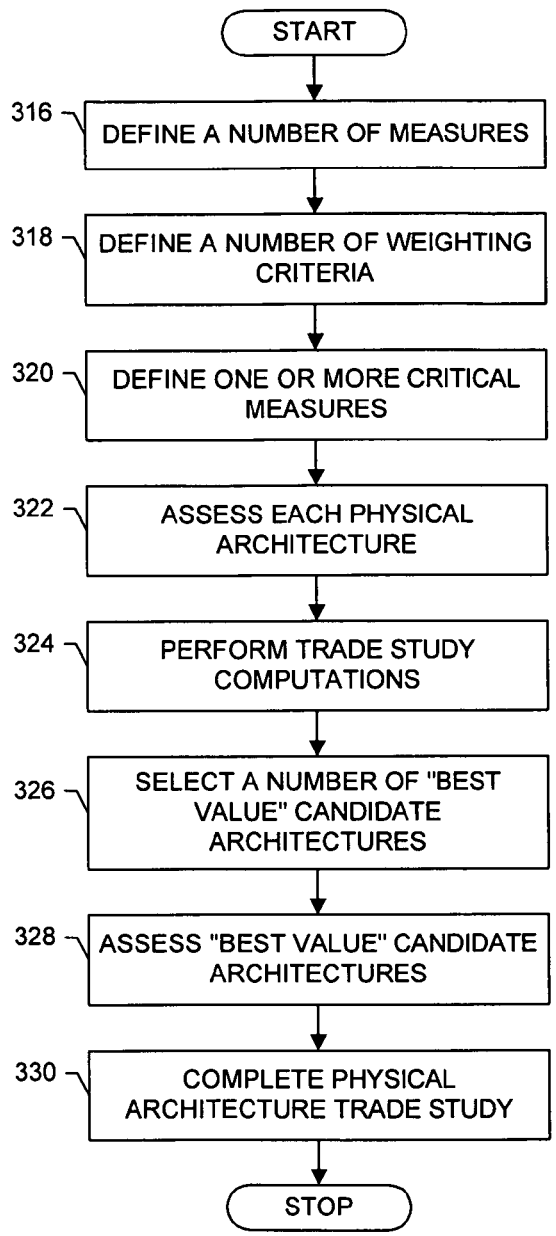
Figure 21:
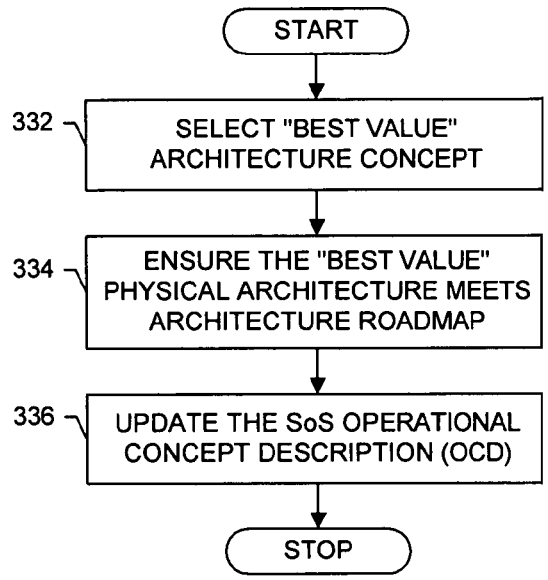

After identifying SoS-level physical architecture candidates, the SoS-level physical architecture candidates can be assessed, as shown in block 60 of FIG. 3. In this regard, a method of assessing the SoS-level physical architecture candidates in accordance with one embodiment of the present invention is illustrated in FIG. 20. As shown in block 316, the method can include defining a number of measures based upon the MOEs, quality attribute utility trees, business strategy and/or customer information. The measures can include, for example, driving performance requirements (e.g., the critical operational issues), key quality attributes (e.g., interoperability, vulnerability, survivability, etc.), highest priority risks (e.g., non-recurring or recurring cost), competitive discriminators, and/or customer bias. In this regard, the definition of the measures can include a figure of merit threshold and objective, such as by creating a simple "S" curve for each figure of merit that emphasizes the region between the threshold and objective to assist in scoring. As will be appreciated, supportive trade studies, modeling and simulation, and analysis may be used to develop such threshold and objective figure of merit values.

After defining the measures, weighting criteria can be determined for each measure, such as in a manner based upon surveys or interviews, as shown in block 318. Next, critical measures can be defined, as show in block 320. As indicated above, network-centric operations (NCO) may be inherent to system of systems. As such, interoperability may be one of the more important critical measures at the SoS 10 level. Irrespective of the defined critical measures, however, the critical measures can thereafter be reviewed and one or more selected based upon the weighting factors.

Next, each critical measure can be assessed for each physical architecture (assembly component diagram) to determine a figure of merit value, as shown in block 322. In this regard, the figure of merit value can be determined in any of a number of different manners. For example, if the figure of merit is less than a threshold value, the physical architecture can be assigned a minimum score. If the figure of merit is between the threshold and one or more objective values, the physical architecture can be assigned a percentage of a maximum score. Otherwise, if the figure of merit is at or above the objective, the physical architecture can be assigned the maximum score.

After determining the figure of merit values, trade study computations can be performed using the list of critical measures, weighting factors and figure of merit scores from each physical architecture, as shown in block 324. For example, computer simulation that compares the performance of network traffic of the candidate architectures can be performed. Next, one or more "best value" candidate architectures can be selected or otherwise identified from the results of the trade study, as shown in block 326. For example, the two top-contending physical architectures can be identified. After identifying the best value candidate architectures, if so desired, features having "merit" from a physical architecture that was not otherwise identified may be added to one or more of the best value physical architectures. In this regard, features having "merit" can include those features that improve performance or reduce cost.

The selected best value candidate architectures can then be assessed, as shown in block 328. For example, for two best value candidate architectures, each measure can be assessed to determine a figure of merit value, such as in the same manner described above (using a threshold and an objective value). Next, the physical architecture trade study can be completed by using the list of measures, weighting factors and scores from each physical architecture, as shown in block 330.

D. Select Best Physical Architecture Referring back to FIG. 6, after assessing the SoS-level physical architecture candidates (see block 60), the best or optimum SoS-level physical architecture can be selected, as shown in block 62. In accordance with one embodiment of the present invention, then, the best SoS-level physical architecture is selected in accordance with the method illustrated in FIG. 21. As shown in block 332 of FIG. 21, a method of selecting the best SoS-level physical architecture includes selecting the "best value" architecture concept (SoS 10 and system 16 tiers) based upon the architecture trade studies. In this regard, the best value architecture concept can be identified from the results of the trade study using an assembly component diagram.

After selecting the best value architecture concept, the best value physical architecture can be checked to ensure that the best value physical architecture meets the architecture roadmap, as shown in block 334. In checking the best value physical architecture, an evolutionary development can be initiated for any design element of the finalized physical architecture for which a lesser technology solution was selected over a higher risk technology, and for which the capacity to evolve was designed in the element and interfacing elements. For more information on such an evolutionary development technique, see C. J. P. FARRUKH, TMAP—A GUIDE TO TECHNOLOGY MANAGEMENT ASSESSMENT PROCEDURE (2000). Then, the SoS OCD can be updated from the use cases and the use case descriptions, as shown in block 336. More particularly, the OCD can be reviewed and refined with information from an SoS assembly component diagram, typically with coordination and agreement with the stakeholders. In this regard, before reviewing and refining the OCD, the SoS assembly component diagram can be generated to illustrate the logical and physical components and packages, the components and packages being connected to show their relationships.

E. Verify Development Products, Generate/Peer-Review Documentation

Figure 22:
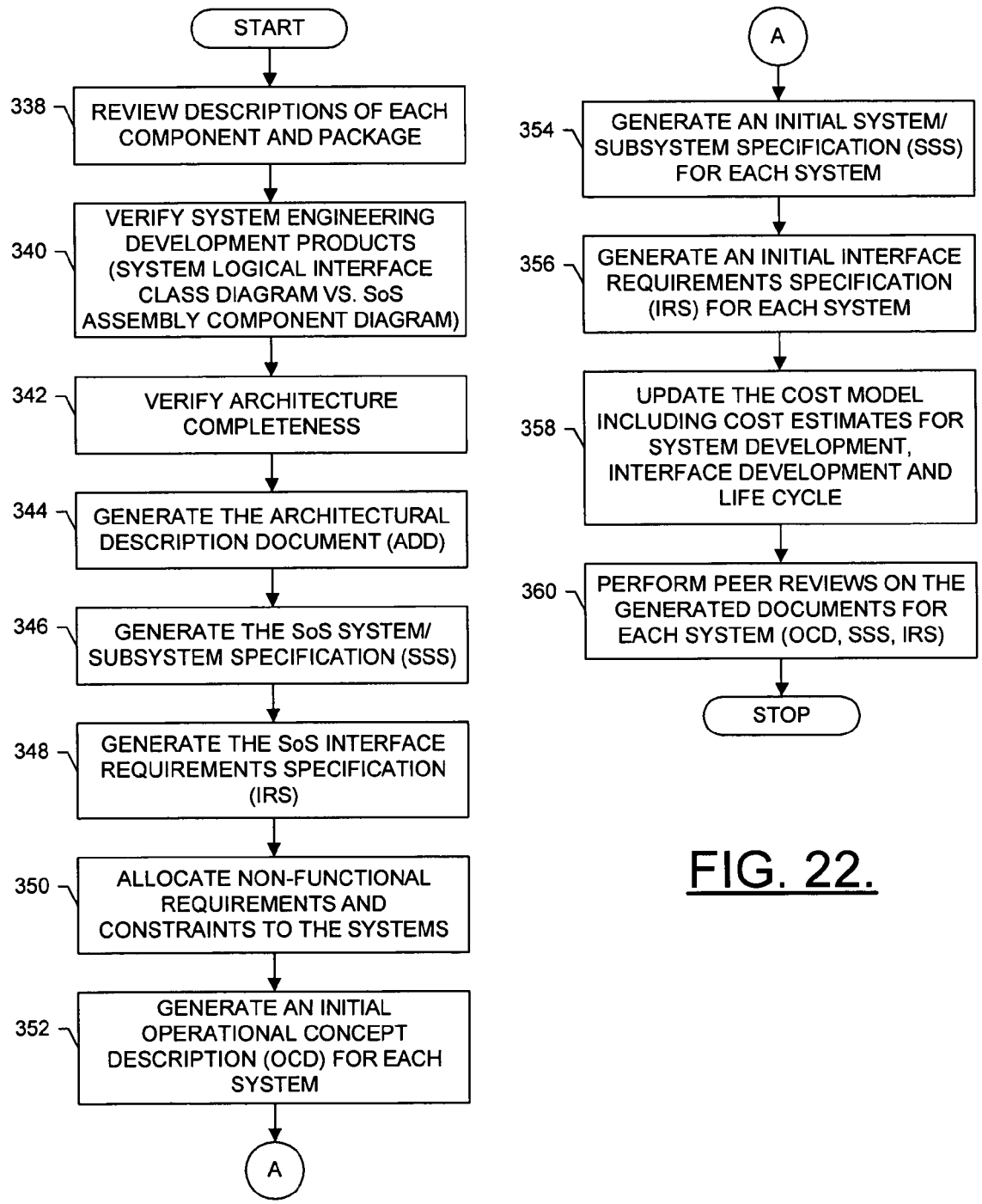
Figure 23:
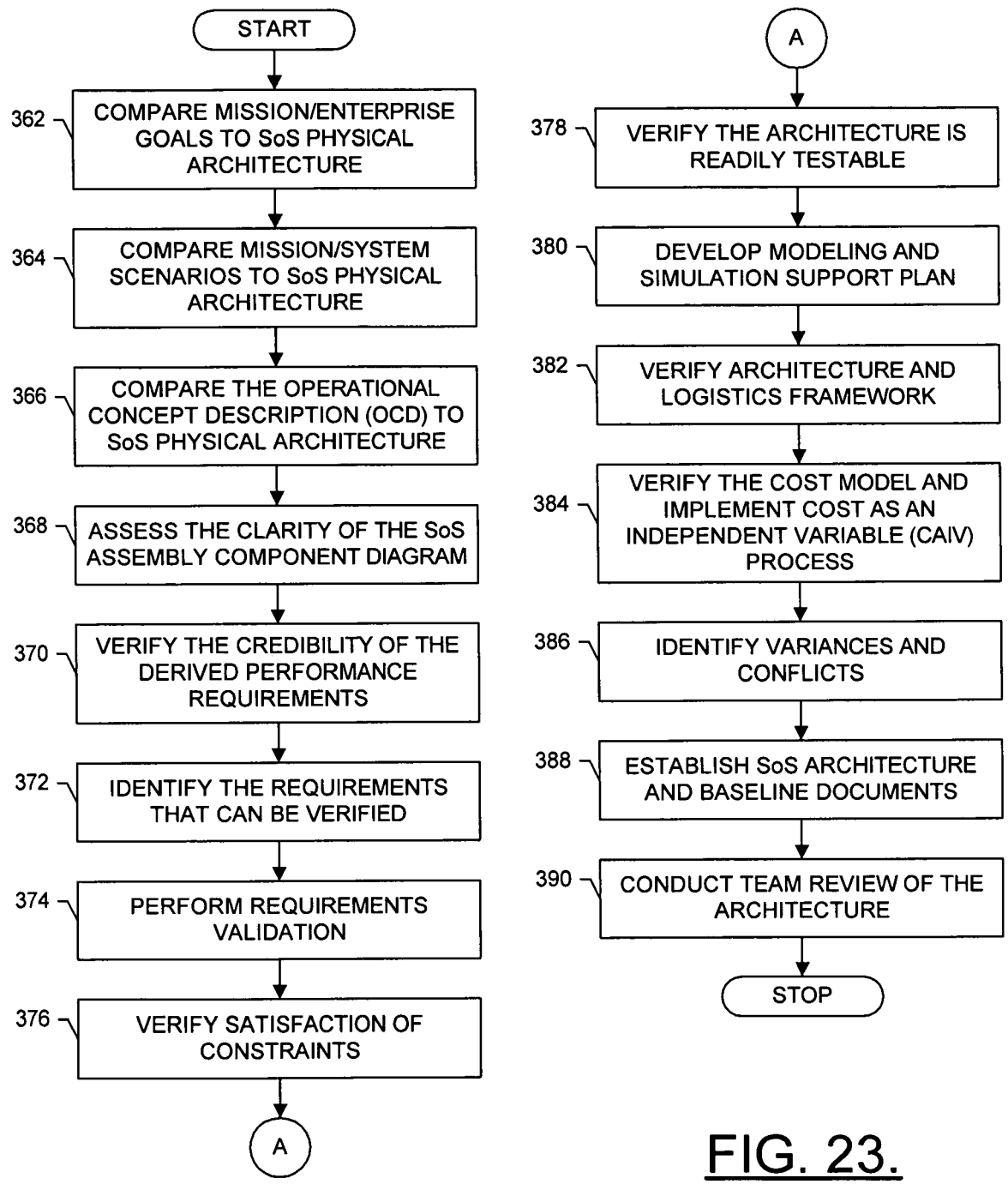

Again referring to FIG. 6, having selected the best SoS-level physical architecture (see block 62), the development products can be verified, with SoS-level documentation being generated and peer reviewed, as shown in block 64 and more particularly in FIG. 22 in accordance with one embodiment of the present invention. Referring now to FIG. 22, a method of verifying development products, generating and peer-reviewing SoS-level documentation can include reviewing the descriptions or diagrams of each component and package, as shown in block 338. More particularly, the SoS logical objects can be reviewed for completeness of information, with the logical objects also being compared to the associated package or component. Each logical object can be checked to ensure the logical object is realized by a package or component, and that there is consistent information between the logical object and associated package or component. Also, if so desired or otherwise required, the package and component descriptions can be updated with functional descriptions, performance requirements, constraints and/or attributes (acquisition strategy, cost estimate, technology maturity, risk assessment etc.).

After reviewing the descriptions of each component and package, system engineering development products can be verified, as shown in block 340. For example the system logical interface class diagram can be verified in comparison to the SoS assembly component diagram. More particularly, the system logical interface class diagram and its class descriptions can be checked to verify consistency between the diagram and its class descriptions. Each logical object in the system logical interface class diagram can be checked to ensure that the logical object has a corresponding physical system in the SoS assembly component diagram. Also, the interfaces between the logical objects in the system logical interface class diagram can be checked to ensure the interfaces are consistent with the associations between the physical systems on the SoS assembly component diagram.

Also in verifying the system engineering development products, the system logical interface class diagram can be reviewed to understand the properties of the classes in the system. In this regard, an omission defect can be identified when the description cannot be found, such as when the class was represented but not described. An ambiguity defect, on the other hand, can be identified when the description is ambiguous for use as a design model. The attributes can also be checked to verify that all of the attributes are described with basic types. In checking the attributes, a consistency defect can be identified when the same set of attributes are not in both the class description and the diagram. An ambiguity defect can be identified when a class should not encapsulate all of the otherwise associated attributes. And an incorrect fact defect can be identified when the types assigned to the attributes are incorrect.

Further, the behaviors and constraints can be checked to verify that all of the behaviors and constraints are described. In this regard, if the same behaviors and constraints are not in both the class description and diagram in the same style or level of granularity to describe the behaviors, a consistency defect can be identified. An ambiguity defect can be identified when a class cannot meaningfully encapsulate all of the otherwise associated behaviors, or when one or more constraints do not make logical sense for a class. An omission defect, on the other hand, can be identified when the class behavior is highly coupled to other class's attributes, or when one or more constraints cannot be satisfied using the defined attributes and behaviors.

Next, after verifying the system engineering development products, the architecture completeness can be verified, as shown in block 342. In verifying the architecture completeness, a requirements trace can be performed to the functional architecture, design architecture, and interfaces. Also, the design elements descriptions can be checked to verify that the design elements descriptions are traceable to requirements of the functional architecture, and the requirements of the functional architecture can be checked to verify that they are allocated and traceable to the design architecture. In verifying the architecture completeness, all of the internal and external design interfaces are preferably upward and downward traceable to their source requirement.

After verifying the architecture completeness, if not previously generated, an ADD can be generated for review, the ADD being generated based upon a referenced ADD template, as shown in block 344. As indicated above, the ADD can include the a conceptual data model, functional process model, description of functional configurations, quality of data of current system, architecture guidelines, physical configurations, functional test strategy, reusable component functional specifications, and/or anticipated cost effectiveness, all of which are well known to those skilled in the art.

Also, a SoS system/subsystem specification (SSS) can be generated for review, such as in the same manner described above, as shown in block 346. In this regard, the SSS can be generated based upon a requirements trace matrix and the requirements management database, and include the additional functional, non-functional, and performance requirements for the SoS 10. In this regard, the requirements trace matrix can document the trace of the requirements, illustrating that the lower-level requirements are associated with higher-level requirements. In addition, if not previously generated, an SoS IRS can be generated for review, such as in the same manner described above and as shown in block 348. The IRS can identify the interfaces between the system logical objects, and can also include additional information regarding the interfaces between the SoS and external systems. In addition, the IRS can include information regarding the interfaces between the packages and components.

In addition to generating the ADD, SSS and IRS, the non-functional requirements and constraints can be allocated to the systems 16, as shown in block 350. More particularly, based upon the "physical architecture" (SoS assembly component diagram) and system worksheet, the non-functional requirements in the requirements management database can be allocated to the physical systems along with the constraints. Thereafter, as shown in block 352, an initial operational concept description (OCD) can be generated for each system to include an overview of the proposed system, operational and functional descriptions of the system, the users and the operational scenarios.

Next, an initial SSS can be generated for each system 16 based upon the allocation in the requirements management database, as shown in block 354. Such an SSS, then, can become a high-level specification for the system that represents the developer "sell-off" requirements. Also, an initial IRS can be generated for each system based upon the SoS functional and physical architectures, as shown in block 356. In this regard, the system logical interface class diagram can be tailored or otherwise modified by placing the described system in the center of the diagram and removing systems that do not directly interface with the respective system. Similarly, the SoS assembly component diagram can be tailored or otherwise modified by placing the described system in the center of the diagram and removing systems that do not directly interface with the respective systems. The tailored diagrams can then be included in the IRS for the respective system. The IRS, then, can become a high-level interface specification for the system that represents the developer "sell-off" interface requirements.

After generating the OCD, SSS and IRS for each system 16, a cost model (i.e., cost description of the SoS) can be updated based upon the best value physical architecture, as shown in block 358. More particularly, the cost estimates for system development, interface development and life cycle can be updated based upon the best value physical architecture. Then, peer reviews can be performed on the generated documents, including the ADD, the OCD, SSS and IRS for the SoS 10, the OCD, initial SSS and IRS for each system, and the cost model such as in the same manner as before, as shown in block 360.

F. Verify Physical Architecture

Referring back to FIG. 6, after performing peer reviews (see block 64), the SoS-level physical architecture can be verified, as shown in block 66. The SoS-level physical architecture can be verified in any of a number of different manners, but in one embodiment of the present invention, the SoS-level physical architecture is verified in accordance with the method of FIG. 23. As shown in block 362 of FIG. 23, then, a method of verifying the SoS-level physical architecture can include comparing the mission/enterprise goals to the SoS physical architecture. In this regard, the SoS physical architecture, or more particularly the ADD, can be assessed based upon the mission/enterprise goals to ensure the SoS physical architecture is compliant to the intent of the goals. Similarly, the mission/system scenarios can be compared to the SoS physical architecture, or more particularly the ADD, as shown in block 364. By comparing the mission/system scenarios to the SoS physical architecture, the SoS physical architecture can be assessed based upon the mission/system scenarios to ensure the SoS physical architecture is compliant to the intent of the scenarios. Likewise, the OCD can be compared to the SoS physical architecture, or more particularly the ADD, to assess if the SoS physical architecture is compliant to the intent of the concept, as shown in block 366.

The clarity of the SoS assembly component diagram can also be assessed, as shown in block 368. In this regard, the SoS assembly component diagram can be reviewed to ensure the SoS boundary is clearly defined and matches the statement of work. Additionally, the functional and physical architectures, or more particularly the system logical interface diagram and the SoS assembly component diagram, respectively, can be compared to ensure the physical architecture represents the functional architecture without implying additional functionality. Further, the credibility of the derived performance requirements can be verified, as shown in block 370. More particularly, the credibility of each MOE or derived performance requirement that is assigned to a package and/or component can be assessed based upon the KPPs. For more information on one exemplar technique for verifying the creditability of the derived performance requirements, see Kathryn A. Kulick, *Technical Performance Measurement—A Systematic Approach to Planning, Integration, and Assessment* (1997-98)<http://www.acq.osd.mil/pm/tpm/kulick.htm>, the contents of which are hereby incorporated by reference in its entirety.

Thereafter, the verifiable requirements can be identified, as shown in block 372. In this regard, from the requirements management database, the functional and performance requirements can be reviewed to determine those requirements that can be verified by means of modeling and simulation, analysis by similarity, or prototyping, as such are well known to those skilled in the art. Then, requirements validation can be performed for those verifiable requirements, such as by means of modeling and simulation, analysis by similarity, or prototyping, as shown in block 374.

Next, the constraints can be verified to ensure that the constraints satisfy and are traceable to the architecture and validated requirements, such as in a manner based upon the ADD, SoS SSS and initial SSS for each system 16, as shown in block 376. Also, the architecture can be verified to ensure the architecture is readily testable using integration and test requirements and constraints, as shown in block 378. More particularly, a plan for verifying the architecture, assessing design completeness, and determining satisfaction of the measures of effectiveness and performance can be developed, such as in a manner based upon the TEMP, ADD, SoS SSS, SoS IRS, initial IRS and SSS for each system 16. At the SoS 10 level, dialogue with the customer development test and evaluation, and operational test and evaluation representatives may facilitate and streamline the overall strategy to leverage schedule and costs. For more information on a technique for verifying the architecture, see Federal Aviation Administration (FAA), *Test and Evaluation Process and Guidance* (May 1999)<http://fast.faa.gov/flowcharts/testflow/sys60T.htm>, the contents of which are hereby incorporated by reference in its entirety.

A modeling and simulation support plan (MSSP) (also referred to as a modeling and simulation plan (MSP) or a simulation support plan (SSP)) can then be developed, as shown in block 380. The MSSP can be developed in any of a number of different manners, but typically captures past, present and future modeling and simulation efforts and ties such efforts to program needs. In addition to the MSSP, development of the MSSP can also result in a software development plan (SDP), configuration management plan, validation, verification and accreditation (VV&A) plans.

After developing a MSSP, the architecture and logistics frameworks can be verified, as shown in block 382. In this regard, a logistics framework for the SoS life cycle processes can be identified, defined and designed, such as by completing requirements analysis, functional analysis and synthesis tasks (see FIG. 3). For more information on one exemplar technique for verifying the architecture and logistics frameworks, see FAA, *Toolsets/Integrated Logistic Support Process Guide/Section* 4 (July 2001)<http://fast.faa.gov/toolsets/ILSPG/Section4.htm>, the contents of which are hereby incorporated by reference in its entirety. Then, the cost model can be verified, with a cost as an independent variable (CAIV) process being implemented, as shown in block 384. For more information on the CAIV process, see Edmund H. Conrow, *A Web Site Devoted to Government Policy and References to Cost as an Independent Variable* (*CAIV*) (1998)<http://www.caiv.com/>, the contents of which are hereby incorporated by reference in its entirety. More particularly, cost models to be generated and tailored to the parameters of the program can be defined. And the program-level life cycle cost (LCC) target can be allocated to the systems.

After verifying the cost model and implementing the CAIV process, any variances and conflicts, such as any voids, variances and conflicts resulting from verification evaluation activities can be identified, as shown in block 386. For example, the variances and conflicts can be identified based upon verification results, a CAIV report, a cost target allocation report, MSSP, a master test plan, the technical standards profile, the ADD, the SSS and IRS of the SoS 10, the initial SSS and IRS for each system 16, the architecture model, the requirements management database and a product support requirements specification.

Next, the SoS architecture and baseline documents can be established, as shown in block 388. In this regard, the SoS baseline can be established and controlled by configuration management of the architecture model, cost model, requirements management database, risk management database, verification and validation plans, and integrated logistics support. The SoS architecture and baseline documents can include, for example, a synthesis verification compliance report, technical standards profile, ADD, OCD, SSS and IRS for the SoS 10, the initial SSS and IRS for each system 16, the architecture model, the requirements management database, risk management database, cost model, CAIV report, cost target allocation report, master test plan, system integration plan, MSSP, product support requirements specification, verification results and/or documentation for customer-mandated systems.

Then, to conclude verification of the SoS-level physical architecture (see block 66 of FIG. 6), the synthesis step (see block 32 of FIG. 3), and thus development of the SoS-to-system architecture (see block 20 of FIG. 2), a team review of the architecture can be conducted, as shown in block 390. In conducting the team review, it can be established that the architecture has been verified against the requirements at a detail commensurate with the SoS 10 level. The successful completion of this review can then establish an entry event to the system-level decomposition iteration. In this regard, the system can be decomposed into subsystems in a number of iterations, where the entry event can comprise, for example, a triggering meeting that results in a decision to move forward.

Again referring to FIG. 2, after concluding development of the SoS-to-system architecture, system-to-subsystem and subsystem-to-configuration item architectures can be developed to thereby develop architectures for the remaining levels of the SoS 10, as indicated above and shown in blocks 22 and 24. The architectures for the remaining levels can be developed in any of a number of different manners, such as in a manner similar to that of the SoS-to-system level described above with respect to FIGS. 3-23. As will be appreciated, however, the input and output products may differ from level to level. For example, a SoS-level context diagram that shows all of the associated systems will typically differ from a similar system-level context diagram for a single system or platform.

More particularly as to a number of differences in designing the different levels of the SoS 10, for example, the steps performed in identifying the requirements sources at the SoS level (see block 34 of FIG. 4 and blocks 68 and 70 of FIG. 7) may differ from similar steps performed at the system level since the systems engineer or other user may chose their entry point into the process based on their knowledge of their initial development level. In this regard, if the systems engineer is performing the similar steps at the system level, the requirements sources may not flow from the engineer's own analysis of the SoS level, but rather from customer supplied SoS requirements documents as described in system-level requirements analysis steps. In a similar manner, then, the steps performed in identifying the requirements sources at the SoS level may differ from similar steps performed at the subsystem level, although the steps may appear more similar between the system and subsystem levels.

Also, for example, the steps performed in verifying the physical architecture at the subsystem level (see block 66 of FIG. 6 for the SoS level) may differ from similar steps performed at the system level, and/or may include additional steps. In this regard, the steps may differ, and/or steps may be added, at the subsystem level because the systems engineer or other user may need to determine if they are at the configuration item level. Then, if the systems engineer is at the configuration item level, the systems engineer may need to perform one or more additional steps to complete the configuration item-level architecture. The systems engineer may need to perform a capabilities assessment of the architecture to the configuration item level to validate the performance of the architecture to customer needs. In performing the capabilities assessment, a capabilities assessment of the detailed design can also be performed to verify that the detailed design is compliant to the configuration item specification. Then, after performing the capabilities assessment of the detailed design, the detailed design can be verified to ensure that the design conforms to the architecture model and meets the system design requirements, if so desired.

Various steps of a method of developing a system-of-systems architecture have been described herein and shown in FIGS. 2-23 in a particular order. It should be understood, however, that the order shown is merely one of a number of different orders capable of being implemented in performing the steps of the method. In this regard, various of the steps of the method or portions of the method can equally be performed in other orders without departing from the spirit and scope of the present invention.

As explained above, the system-of-systems architecture has been developed for a physical complex system, the physical complex system including a physical architecture. It should be understood, however, that the same method can be performed to develop a logical complex system, complex process or the like. In such instances, the method can be performed as explained above, concluding with a logical architecture for the complex system. As described herein, then, the system-of-systems can reference a physical or logical system without departing from the spirit and scope of the present invention.

As shown in FIG. 24, the system of the present invention is typically embodied by a processing element and an associated memory device, both of which are commonly comprised by a computer system 400 or the like. In this regard, as indicated above, the method of embodiments of the present invention can be at least partially performed by the processing element manipulating data stored by the memory device with any one of a number of commercially available computer software programs. For example, the method can be at least partially performed by the processing element manipulating data stored by the memory device with a modeling language (e.g., UML) modeling software program such as, for example, the Rational Rose® software package distributed by IBM Corporation of Armonk, N.Y., the System Architect® software package distributed by Popkin Software of New York, N.Y., or Rhapsody® software package distributed by I-Logix Inc. of Andover, Mass. The computer system can include a display 402 for presenting information relative to performing embodiments of the method of the present invention. To plot information relative to performing embodiments of the method of the present invention, the computer system can further include a printer 404.

Also, the computer system 400 can include a means for locally or remotely transferring the information relative to performing embodiments of the method of the present invention. For example, the computer system can include a facsimile machine 406 for transmitting information to other facsimile machines, computer systems or the like. Additionally, or alternatively, the computer system can include a modem 408 to transfer information to other computers or the like. Further, the computer system can include an interface (not shown) to a network, such as a local area network (LAN), and/or a wide area network (WAN). For example, the computer system can include an Ethernet Personal Computer Memory Card International Association (PCMCIA) card configured to transmit and receive information to and from a LAN, WAN or the like.

Thus, according to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. It should be understood that the computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

In this regard, FIGS. 2-23 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of developing an architecture model for a system-of-systems (SoS) comprising a plurality of components, wherein the SoS comprises n system levels $L_1 \ldots L_n$ that each include at least one component of the SoS, wherein for at least i>1 each system level $L_i$ comprises at least one component of level $L_{i-1}$, wherein the components of the SoS collaborate to realize at least one goal established for the SoS, and wherein the method comprises:

establishing a requirements baseline for at least one level of the SoS, the requirements baseline including a plurality of modeling diagrams including a use case diagram, a class diagram and an interface class diagram;

establishing a functional architecture model for the level, the functional architecture model including a plurality of modeling diagrams including an activity diagram, a state diagram, a collaboration diagram and a sequence diagram, wherein for at least i>1 the established functional architecture model for level $L_{i-1}$ includes a functional and a logical structure for level $L_{i-1}$, the functional architecture model being developed based upon a concurrent functional and logical decomposition of a functional architecture model developed for level $L_i$;

establishing a physical architecture model for the level, the physical architecture model including a plurality of modeling diagrams including a class diagram and a component diagram; and developing the architecture model for the level of the SoS based upon the requirements baseline, functional architecture model and physical architecture model.

2. A method according to claim 1, wherein establishing a requirements baseline comprises establishing a requirements baseline based upon a plurality of unified modeling language (UML) diagrams.

3. A method according to claim 1, wherein establishing a requirements baseline for the level comprises:

identifying at least one requirements source;

developing at least one mission/system scenario, wherein developing at least one mission/system scenario includes:

identifying at least one mission/enterprise goal and at least one value recipient; and identifying at least one mission/enterprise service required to achieve at least one mission/enterprise goal, and wherein the mission/system scenario is developed to achieve at least one mission/enterprise service for the level based upon at least one requirements source;

assessing at least one functional requirement for the level based upon at least one developed mission/system scenario;

verifying at least one development product, and thereafter generating and peer-reviewing level documentation; and performing a requirements validation.

4. A method according to claim 1, wherein establishing a functional architecture model comprises establishing a functional architecture model based upon a plurality of unified modeling language (UML) diagrams.

5. A method according to claim 1, wherein establishing a functional architecture model comprises:

performing a functional analysis, including performing functional analysis for the level to thereby establish a functional architecture model for the level that can be traced to a requirements baseline;

developing a functional architecture model for the level, the functional architecture model including a functional and a logical structure for level;

incorporating at least one effect of at least one quality attribute into the functional architecture model for the level;

identifying at least one alternative functional architecture candidate model, and thereafter selecting a functional architecture model for the level from the developed functional architecture model and the at least one alternative functional architecture candidate model;

verifying at least one development product, and thereafter generating and peer-reviewing level documentation; and verifying the selected functional architecture model against a requirements baseline for the level.

6. A method according to claim 1, wherein for at least i>1 developing an architecture model for level $L_{i-1}$ further comprises transforming the level $L_{i-1}$ functional architecture model into a physical architecture model for level $L_{i-1}$.

7. A method according to claim 1, wherein establishing a physical architecture model comprises establishing a physical architecture model based upon a plurality of unified modeling language (UML) diagrams.

8. A method according to claim 1, wherein establishing a physical architecture model comprises:

identifying an initial physical architecture model for the level;

identifying at least one alternative physical architecture candidate model for the level;

assessing the initial physical architecture model and the at least one alternative physical architecture candidate model;

selecting a physical architecture model for the level based upon the assessment of the initial physical architecture model and the at least one alternative physical architecture candidate model;

verifying at least one development product, and thereafter generating and peer-reviewing level documentation; and verifying the selected physical architecture model against a requirements baseline and the functional architecture for the level.

9. A computer program product for performing a method of developing an architecture model for a system-of-systems (SoS) comprising a plurality of components, wherein the SoS comprises n system levels $L_1 \ldots L_n$ that each include at least one component of the SoS, wherein for at least i>1 each system level $L_i$ comprises at least one component of level $L_{i-1}$, wherein the components of the SoS collaborate to realize at least one goal established for the SoS, and wherein the computer program product comprises at least one computer-readable storage medium having computer-readable program code portions stored therein and configured to at least one of perform or facilitate performance of the method, the method comprising:

establishing a requirements baseline for the level, the requirements baseline including a plurality of modeling diagrams including a use case diagram, a class diagram and an interface class diagram;

establishing a functional architecture model for the level, the functional architecture model including a plurality of modeling diagrams including an activity diagram, a state diagram, a collaboration diagram and a sequence diagram, wherein for at least i>1 the established functional architecture model for level $L_{i-1}$ includes a functional and a logical structure for level $L_{i-1}$, the functional architecture model being developed based upon a concurrent functional and logical decomposition of a functional architecture model developed for level $L_i$;

establishing a physical architecture model for the level, the physical architecture model including a plurality of modeling diagrams including a class diagram and a component diagram; and developing the architecture model for the level of the SoS based upon the requirements baseline, functional architecture model and physical architecture model.

10. A computer program product according to claim 9, wherein establishing a requirements baseline comprises establishing a requirements baseline based upon a plurality of unified modeling language (UML) diagrams.

11. A computer program product according to claim 9, wherein establishing a requirements baseline for the level comprises:

identifying at least one requirements source;

developing at least one mission/system scenario, wherein developing at least one mission/system scenario includes:

identifying at least one mission/enterprise goal and at least one value recipient; and identifying at least one mission/enterprise service required to achieve at least one mission/enterprise goal, and wherein the mission/system scenario is developed to achieve at least one mission/enterprise service for the level based upon at least one requirements source;

assessing at least one functional requirement for the level based upon at least one developed mission/system scenario;

verifying at least one development product, and thereafter generating and peer-reviewing level documentation; and performing a requirements validation.

12. A computer program product according to claim 9, wherein establishing a functional architecture model comprises establishing a functional architecture model based upon a plurality of unified modeling language (UML) diagrams.

13. A computer program product according to claim 9, wherein establishing a functional architecture model comprises:

performing a functional analysis, including performing functional analysis for the level to thereby establish a functional architecture model for the level that can be traced to a requirements baseline;

developing a functional architecture model for the level, the functional architecture model including a functional and a logical structure for level;

incorporating at least one effect of at least one quality attribute into the functional architecture model for the level;

identifying at least one alternative functional architecture candidate model, and thereafter selecting a functional architecture model for the level from the developed functional architecture model and the at least one alternative functional architecture candidate model;

verifying at least one development product, and thereafter generating and peer-reviewing level documentation; and verifying the selected functional architecture model against a requirements baseline for the level.

14. A computer program product according to claim 9, wherein for at least i>1 developing an architecture model for level $L_{i-1}$ further comprises transforming the level $L_{i-1}$ functional architecture model into a physical architecture model for level $L_{i-1}$.

15. A computer program product according to claim 9, wherein establishing a physical architecture model comprises establishing a physical architecture model based upon a plurality of unified modeling language (UML) diagrams.

16. A computer program product according to claim 9, wherein establishing a physical architecture model comprises:

identifying an initial physical architecture model for the level;

identifying at least one alternative physical architecture candidate model for the level;

assessing the initial physical architecture model and the at least one alternative physical architecture candidate model;

selecting a physical architecture model for the level based upon the assessment of the initial physical architecture model and the at least one alternative physical architecture candidate model;

verifying at least one development product, and thereafter generating and peer-reviewing level documentation; and verifying the selected physical architecture model against a requirements baseline and the functional architecture for the level.

17. A computer program product for performing a method of developing an architecture model for a system-of-systems (SoS) having a plurality of components that collaborate to realize at least one goal for the SoS, the components being arranged with at least two levels and with each relative upper level including at least one component of a relative lower level beneath the upper level, wherein the computer program product comprises at least one computer-readable storage medium having computer-readable program code portions stored therein and configured to at least one of perform or facilitate performance of the method, the method comprising:

establishing a requirements baseline for at least one level, the requirements baseline including a plurality of modeling diagrams including a use case diagram, a class diagram and an interface class diagram;

establishing a functional architecture model for the level, the functional architecture model including a plurality of modeling diagrams including an activity diagram, a state diagram, a collaboration diagram and a sequence diagram, wherein for a relative lower level the established functional architecture model includes a functional and a logical structure, the functional architecture model being developed based on a concurrent functional and logical decomposition of a functional architecture model developed for the level immediately above the respective relative lower level;

establishing a physical architecture model for the level, the physical architecture model including a plurality of modeling diagrams including a class diagram and a component diagram; and developing the architecture model for the level of the SoS based upon the requirements baseline, functional architecture model and physical architecture model.

18. A computer program product according to claim 17, wherein establishing a requirements baseline comprises establishing a requirements baseline based upon a plurality of unified modeling language (UML) diagrams.

19. A computer program product according to claim 17, wherein establishing a requirements baseline for the level comprises:
   identifying at least one requirements source;
   developing at least one mission/system scenario, wherein developing at least one mission/system scenario includes:
      identifying at least one mission/enterprise goal and at least one value recipient; and
      identifying at least one mission/enterprise service required to achieve at least one mission/enterprise goal, and wherein the mission/system scenario is developed to achieve at least one mission/enterprise service for the level based upon at least one requirements source;
   assessing at least one functional requirement for the level based upon at least one developed mission/system scenario;
   verifying at least one development product, and thereafter generating and peer-reviewing level documentation; and
   performing a requirements validation.

20. A computer program product according to claim 17, wherein establishing a functional architecture model comprises establishing a functional architecture model based upon a plurality of unified modeling language (UML) diagrams.

21. A computer program product according to claim 17, wherein establishing a functional architecture model comprises:
   performing a functional analysis, including performing functional analysis for the level to thereby establish a functional architecture model for the level that can be traced to a requirements baseline;
   developing a functional architecture model for the level, the functional architecture model including a functional and a logical structure for level;
   incorporating at least one effect of at least one quality attribute into the functional architecture model for the level;
   identifying at least one alternative functional architecture candidate model, and thereafter selecting a functional architecture model for the level from the developed functional architecture model and the at least one alternative functional architecture candidate model;
   verifying at least one development product, and thereafter generating and peer-reviewing level documentation; and
   verifying the selected functional architecture model against a requirements baseline for the level.

22. A computer program product according to claim 17, wherein developing an architecture model further includes transforming the functional architecture model for the respective relative lower level into a physical architecture model for the respective relative lower level.

23. A computer program product according to claim 17, wherein establishing a physical architecture model comprises establishing a physical architecture model based upon a plurality of unified modeling language (UML) diagrams.

24. A computer program product according to claim 17, wherein establishing a physical architecture model comprises:
   identifying an initial physical architecture model for the level;
   identifying at least one alternative physical architecture candidate model for the level;
   assessing the initial physical architecture model and the at least one alternative physical architecture candidate model;
   selecting a physical architecture model for the level based upon the assessment of the initial physical architecture model and the at least one alternative physical architecture candidate model;
   verifying at least one development product, and thereafter generating and peer-reviewing level documentation; and
   verifying the selected physical architecture model against a requirements baseline and the functional architecture for the level.

25. A method of developing an architecture model for a system-of-systems (SoS) having a plurality of components that collaborate to realize at least one goal for the SoS, the components being arranged with at least two levels and with each relative upper level including at least one component of a relative lower level beneath the upper level, the method comprising:
   establishing a requirements baseline for at least one level, the requirements baseline including a plurality of modeling diagrams including a use case diagram, a class diagram and an interface class diagram;
   establishing a functional architecture model for the level, the functional architecture model including a plurality of modeling diagrams including an activity diagram, a state diagram, a collaboration diagram and a sequence diagram;
   establishing a functional architecture model for the level, the functional architecture model including a plurality of modeling diagrams including an activity diagram, a state diagram, a collaboration diagram and a sequence diagram, wherein for a relative lower level the established functional architecture model includes a functional and a logical structure, the functional architecture model being developed based on a concurrent functional and logical decomposition of a functional architecture model developed for the level immediately above the respective relative lower level;
   establishing a physical architecture model for the level, the physical architecture model including a plurality of modeling diagrams including a class diagram and a component diagram; and
   developing the architecture model for the level of the SoS based upon the requirements baseline, functional architecture model and physical architecture model.

* * * * *